United States Patent
Rao et al.

(10) Patent No.: US 10,625,207 B2
(45) Date of Patent: Apr. 21, 2020

(54) SYSTEM FOR PHOTOELECTROCHEMICAL AIR PURIFICATION

(71) Applicants: Jaya Rao, San Francisco, CA (US); Dilip Goswami, San Francisco, CA (US); David Sanabria, San Francisco, CA (US); Peter Riering-Czekalla, San Francisco, CA (US)

(72) Inventors: Jaya Rao, San Francisco, CA (US); Dilip Goswami, San Francisco, CA (US); David Sanabria, San Francisco, CA (US); Peter Riering-Czekalla, San Francisco, CA (US)

(73) Assignee: Molekule, Inc., San Francisco, CA (US)

( * ) Notice: Subject to any disclaimer, the term of this patent is extended or adjusted under 35 U.S.C. 154(b) by 0 days.

(21) Appl. No.: 16/178,393

(22) Filed: Nov. 1, 2018

(65) Prior Publication Data
US 2019/0126202 A1 May 2, 2019

Related U.S. Application Data

(60) Provisional application No. 62/580,385, filed on Nov. 1, 2017.

(51) Int. Cl.
| | | |
|---|---|---|
| A61L 2/20 | (2006.01) | |
| B01D 53/88 | (2006.01) | |
| B01D 53/72 | (2006.01) | |
| B01D 53/86 | (2006.01) | |
| B01D 53/00 | (2006.01) | |

(52) U.S. Cl.
CPC ........... B01D 53/885 (2013.01); B01D 53/72 (2013.01); *B01D 53/007* (2013.01); *B01D 53/8696* (2013.01); *B01D 2255/206* (2013.01); *B01D 2255/20707* (2013.01); *B01D 2255/702* (2013.01); *B01D 2255/802* (2013.01); *B01D 2255/806* (2013.01); *B01D 2255/9202* (2013.01); *B01D 2257/708* (2013.01); *B01D 2257/91* (2013.01); *B01D 2258/06* (2013.01); *B01D 2259/4508* (2013.01);
(Continued)

(58) Field of Classification Search
CPC ....................................................... A61L 2/205
See application file for complete search history.

(56) References Cited

U.S. PATENT DOCUMENTS

| | | |
|---|---|---|
| 4,065,276 A | 12/1977 | Nakaya et al. |
| 4,896,590 A | 1/1990 | Groos |

(Continued)

FOREIGN PATENT DOCUMENTS

JP 2017148484 A 8/2017

OTHER PUBLICATIONS

Molekule Website Screen Capture from Jun. 10, 2016 by Wayback Machine. (Year: 2016).*
(Continued)

*Primary Examiner* — Donald R Spamer
(74) *Attorney, Agent, or Firm* — Jeffrey Schox; Diana Lin

(57) ABSTRACT

An air purification system that includes a housing including a pedestal and an outer shell, wherein the outer shell is operable between an extended configuration and a compacted configuration, and includes a filter arranged within the housing along a flow path between an inlet and an outlet of the housing.

20 Claims, 8 Drawing Sheets

(52) U.S. Cl.
CPC .... *B01D 2259/80* (2013.01); *B01D 2259/802* (2013.01); *B01D 2259/804* (2013.01)

(56) References Cited

U.S. PATENT DOCUMENTS

| | | | |
|---|---|---|---|
| 4,931,654 A * | 6/1990 | Horng | A61L 9/20 |
| | | | 250/428 |
| D328,946 S | 8/1992 | Havrilla | |
| D360,635 S | 7/1995 | Mark | |
| D362,441 S | 9/1995 | Mark | |
| 5,505,904 A * | 4/1996 | Haidinger | A61L 9/20 |
| | | | 250/435 |
| 5,620,669 A | 4/1997 | Plinke et al. | |
| D400,663 S | 11/1998 | Furlough | |
| 5,922,093 A | 7/1999 | James et al. | |
| 6,607,702 B1 | 8/2003 | Kang et al. | |
| D493,874 S | 8/2004 | Woods | |
| D505,999 S | 6/2005 | Song | |
| D552,724 S | 10/2007 | Chen | |
| D611,579 S | 3/2010 | Zlotnik et al. | |
| D648,429 S | 11/2011 | Choi et al. | |
| D652,408 S | 1/2012 | Chen | |
| D687,017 S | 7/2013 | Ashcraft et al. | |
| D697,496 S | 1/2014 | Ashcraft et al. | |
| 8,658,046 B2 | 2/2014 | Barry et al. | |
| D710,329 S | 8/2014 | Holzer | |
| D716,427 S | 10/2014 | Lim et al. | |
| D717,420 S | 11/2014 | Von Seggern | |
| D744,541 S | 12/2015 | Langhammer et al. | |
| D752,732 S | 3/2016 | Ansley et al. | |
| D754,832 S | 4/2016 | Seo et al. | |
| D766,213 S | 9/2016 | Hinokio | |
| D768,844 S | 10/2016 | Koseoglu et al. | |
| D773,704 S | 12/2016 | Pardo et al. | |
| D774,020 S | 12/2016 | Hinokio | |
| D796,019 S | 8/2017 | Thompson | |
| D802,022 S | 11/2017 | Yao et al. | |
| D803,369 S | 11/2017 | Kim et al. | |
| D803,810 S | 11/2017 | Lee et al. | |
| D804,002 S | 11/2017 | Huang | |
| D805,622 S | 12/2017 | Lee | |
| D806,843 S | 1/2018 | McDonnell | |
| D807,327 S | 1/2018 | Xiong | |
| D808,927 S | 1/2018 | Schaal et al. | |
| D810,049 S | 2/2018 | Lee et al. | |
| D810,135 S | 2/2018 | Langhammer et al. | |
| D810,137 S | 2/2018 | Tsang et al. | |
| D810,265 S | 2/2018 | Chen | |
| D810,266 S | 2/2018 | Li | |
| D818,097 S | 5/2018 | Cho et al. | |
| D828,912 S | 9/2018 | Powell et al. | |
| D829,312 S | 9/2018 | Riering-Czekalla et al. | |
| D829,314 S | 9/2018 | Cho et al. | |
| D831,810 S | 10/2018 | Cho et al. | |
| D831,811 S | 10/2018 | Cho et al. | |
| D832,414 S | 10/2018 | Sharma et al. | |
| D834,694 S | 11/2018 | Walter et al. | |
| 10,137,216 B2 | 11/2018 | Goswami et al. | |
| D835,766 S | 12/2018 | Chen | |
| D836,760 S | 12/2018 | Fredäng et al. | |
| 10,183,187 B2 | 1/2019 | Li | |
| 2003/0180200 A1 | 9/2003 | Reisfeld | |
| 2004/0013583 A1 | 1/2004 | Burkhardt | |
| 2004/0166037 A1 | 8/2004 | Youdell et al. | |
| 2005/0061656 A1 | 3/2005 | Benoit et al. | |
| 2005/0138905 A1 * | 6/2005 | Kubokawa | B01D 46/0016 |
| | | | 55/497 |
| 2006/0150818 A1 | 7/2006 | Okamoto et al. | |
| 2007/0199288 A1 * | 8/2007 | Paterson | B01D 46/0004 |
| | | | 55/484 |
| 2008/0112845 A1 | 5/2008 | Dunn et al. | |
| 2009/0002985 A1 | 1/2009 | Peck et al. | |
| 2009/0175757 A1 | 7/2009 | Yao et al. | |
| 2009/0229478 A1 | 9/2009 | Wu | |
| 2009/0245594 A1 | 10/2009 | Abramovich et al. | |
| 2010/0101413 A1 | 4/2010 | Jones et al. | |
| 2010/0143205 A1 * | 6/2010 | Engelhard | A61L 9/205 |
| | | | 422/121 |
| 2010/0196223 A1 | 8/2010 | Hay et al. | |
| 2010/0260644 A1 | 10/2010 | Day et al. | |
| 2011/0101712 A1 * | 5/2011 | LaConte | E05B 17/0041 |
| | | | 292/252 |
| 2011/0117002 A1 | 5/2011 | Dardas et al. | |
| 2013/0036908 A1 | 2/2013 | Jones et al. | |
| 2014/0290489 A1 | 10/2014 | Uemura et al. | |
| 2015/0008014 A1 | 1/2015 | Zhou et al. | |
| 2015/0320900 A1 | 11/2015 | Goswami et al. | |
| 2017/0043044 A1 * | 2/2017 | Sobhy | A61L 2/18 |
| 2017/0122605 A1 | 5/2017 | Lee et al. | |
| 2017/0321717 A1 | 11/2017 | Park et al. | |
| 2018/0027809 A1 | 2/2018 | Chiattello et al. | |
| 2018/0117511 A1 * | 5/2018 | Yamauchi | B01D 45/12 |

OTHER PUBLICATIONS

Hou, et al. "A review of surface plasmon resonance-enhanced photocatalysis." Advanced 4, 15 Functional Materials 23.13 (Apr. 5, 2013): 1612-1619. p. 1 col. 2 para 1, p. 2 col. 1 para 2.

"Molekule Air Purifier found online—[Feb. 22, 2018]—https://molekule.com/?utm_source=google_search_search&utm_medium=rt&utm_campaign=brand&utm_term=term=molekule&utm_content=bmm_2&gclid=EAaIQobChMI5ufdtbK62QIViYjICh3d8gvEAYAASAAEgJcdPD_BwE".

Ochiai, et al. "Photoelectrochemical properties of TiO2 photocatalyst and its applications for environmental purification." Journal of Photochemistry and Photobiology C: Photochemistry reviews 13.4 (Dec. 1, 2012): 247-262.

International Search Report and Written Opinion for PCT Application No. PCT/US2019/043804 dated Dec. 2, 2019.

* cited by examiner

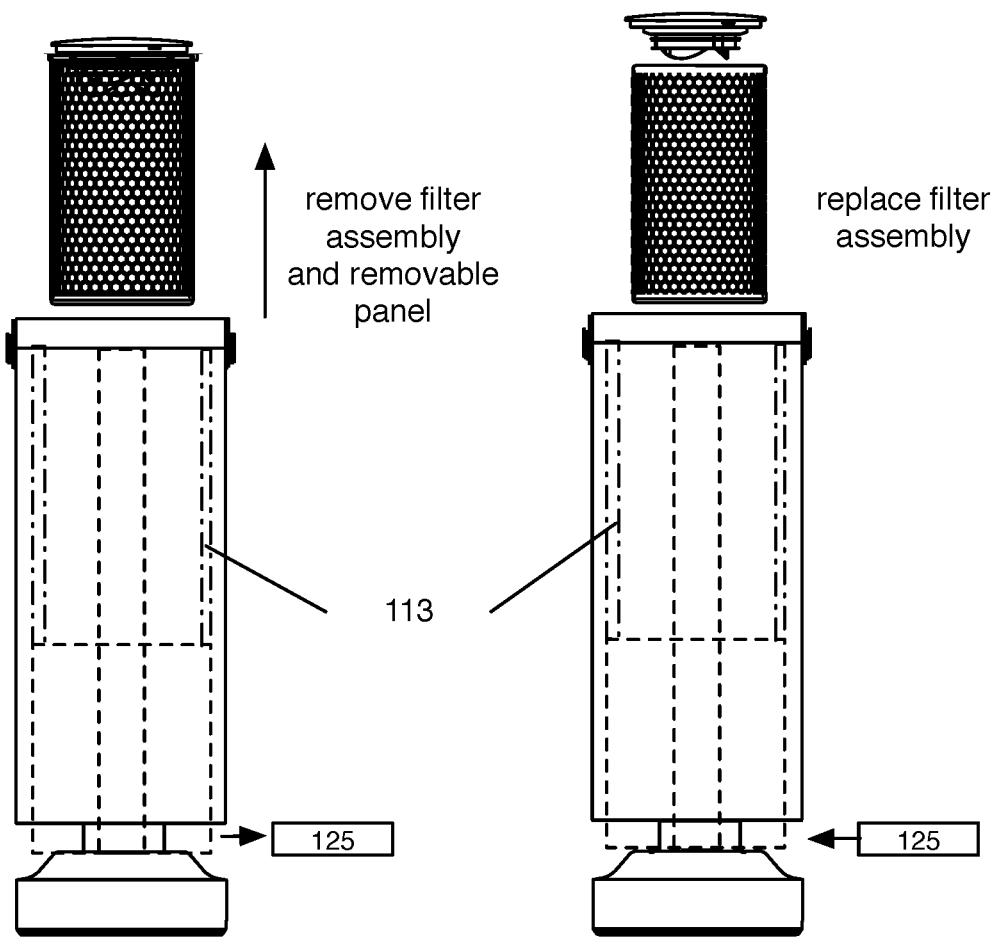
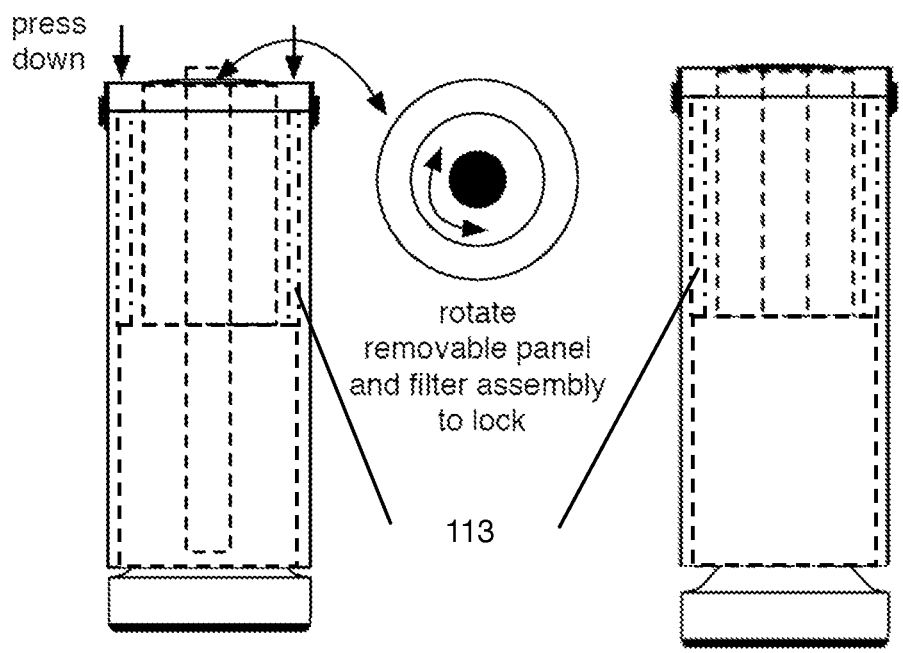
FIGURE 5C  FIGURE 5D
FIGURE 5E  FIGURE 5F

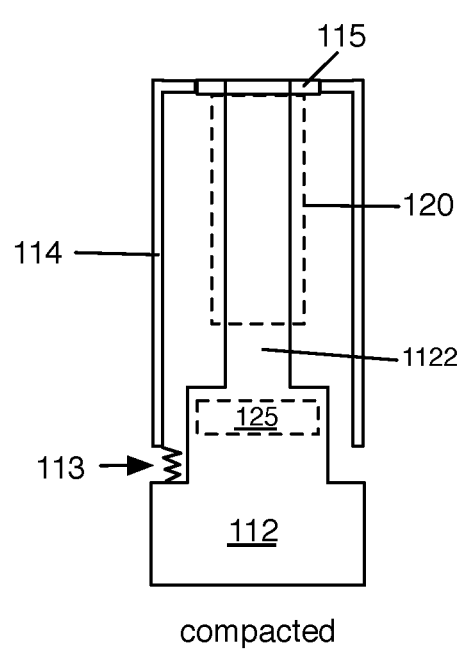
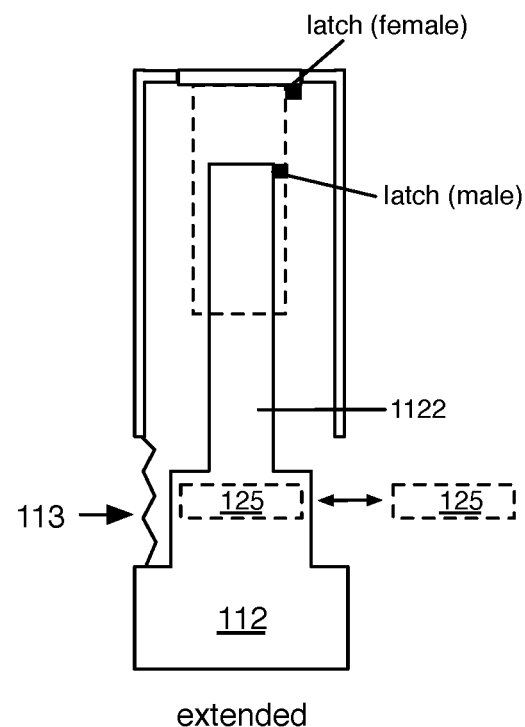
FIGURE 8A — compacted
FIGURE 8B — extended
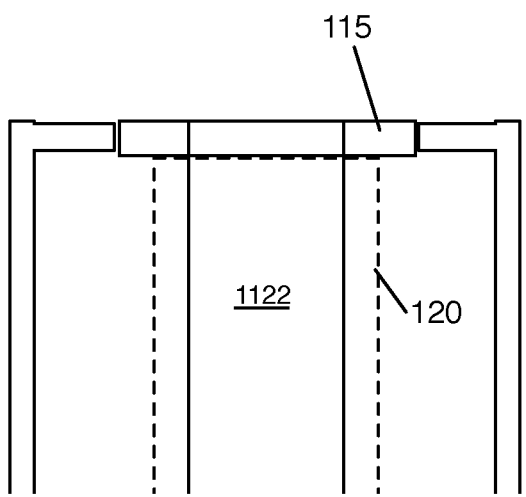
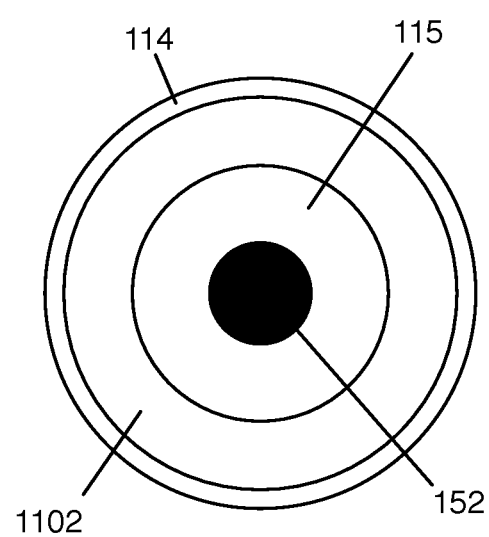
FIGURE 9A
FIGURE 9B

# SYSTEM FOR PHOTOELECTROCHEMICAL AIR PURIFICATION

CROSS-REFERENCE TO RELATED APPLICATIONS

This application claims the benefit of U.S. Provisional Application No. 62/580,385, filed 1 Nov. 2017, which is incorporated herein in its entirety by this reference.

TECHNICAL FIELD

This invention relates generally to the air purification field, and more specifically to a new and useful system for pollutant reduction in a fluid stream in the air purification field.

BRIEF DESCRIPTION OF THE FIGURES

FIG. 5C depicts a cross-sectional and partially exploded view of the example configuration of FIG. 5B during a second portion of filter replacement;

FIG. 5D depicts a cross-sectional and partially exploded view of the example configuration of FIG. 5C during a third portion of filter replacement;

FIG. 5E depicts a cross-sectional view of the example configuration of FIG. 5D during a fourth portion of filter replacement;

FIG. 5F depicts a cross-sectional view of the example configuration of FIG. 5A after filter replacement;

FIGS. 8A-8B depict cross-sectional views of compacted and extended configurations, respectively, of a portion of an embodiment of the air purification system;

FIGS. 9A-9B depict a cross-sectional and top-down view, respectively, of a portion of an embodiment of the air purification system;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1A:
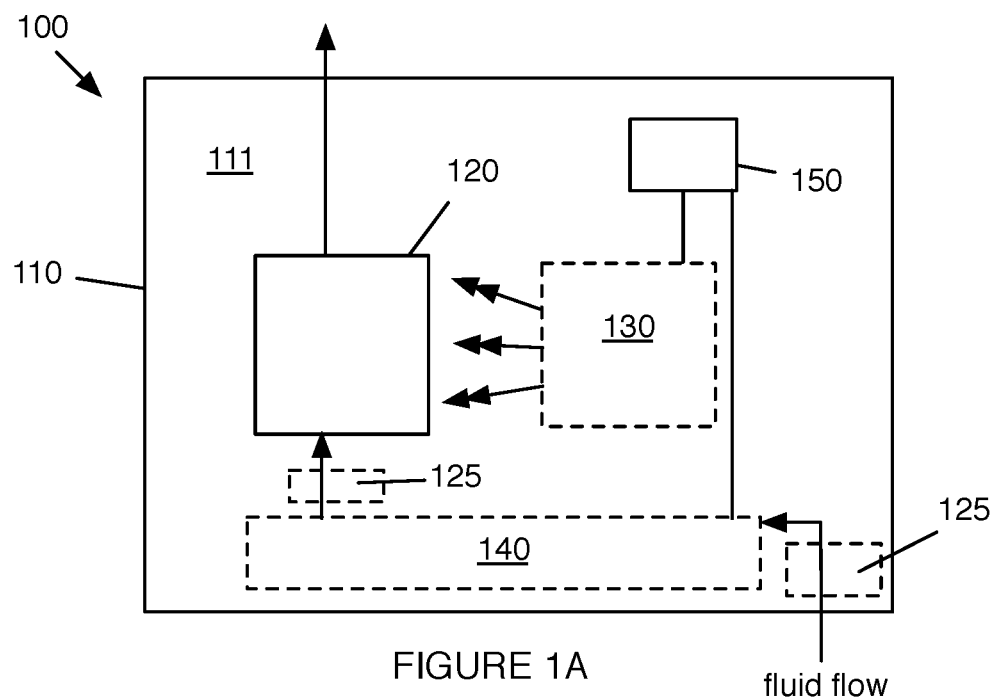
FIG. 1A depicts a schematic illustration of an example embodiment of the air purification system.

As shown in FIG. 1A, an embodiment of the system 100 for air purification can include a housing 110 that defines a lumen 111 and that includes a pedestal 112 and an outer shell 114. The system 100 can also include: a primary filter assembly 120 retained by the housing, a prefilter assembly 125 retained by the housing, a flow control mechanism 140 disposed within the lumen 111 of the housing 110 and configured to urge fluid flow through the housing 110 between an inlet 1101 and an outlet, a photon source 130 arranged to illuminate the primary filter assembly, and/or a control subsystem 150 communicatively coupled to the flow control mechanism 140 and/or the photon source 130.

Figure 1B:
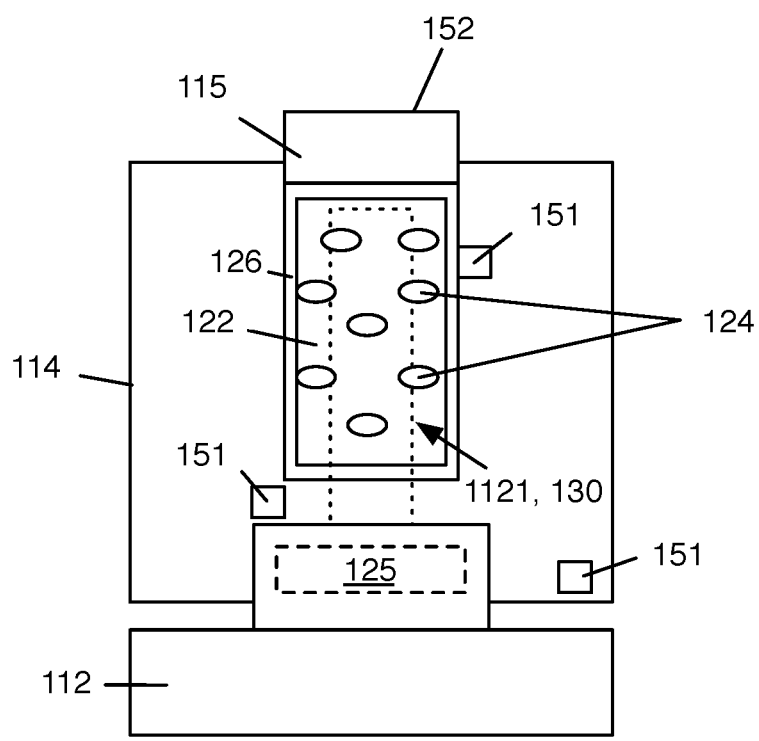
FIG. 1B depicts a schematic illustration of an example embodiment of the air purification system.

In a specific example, as shown in FIG. 1B, the housing 110 can include a pedestal 112 and an outer shell 114 configured to mate with the pedestal, wherein the outer shell 114 includes a removable panel 115 that couples to and retains the filter assembly and a user-interface 152 of the control subsystem; however, the housing 110 can additionally or alternatively include any other suitable components. The filter assembly preferably includes a substrate, and a support structure 126 attached to the substrate 122 and defining a shape of the substrate 122 material. The filter assembly can also include a photocatalytic material 124 disposed on the substrate 122. The system 100 can optionally include a prefilter assembly 125 retained within the housing, as well as any other suitable mechanisms and/or components for facilitating air purification.

The system 100 functions to provide responses (e.g., physical responses, mechanical responses, audio-visual responses, etc.) to user interactions which facilitate proper system utilization (e.g., for air purification, for filter replacement, for filter insertion and/or removable, etc.). The system 100 can also function to guide the user (e.g., via mechanical guides, via generated messages, etc.) in how to properly interact with the system 100 (e.g., to operate the system to purify air, to maintain the system, etc.).

The system 100 can also function to eliminate airborne pollutants from a fluid stream. Pollutants can include volatile organic compounds (VOCs), biological contaminants (e.g., bacteria, viruses, mold spores, etc.), soot particles, and any other pollutants that can be found in indoor and/or outdoor airflows. The system 100 can also function to integrate into existing airflow systems (e.g., HVAC ducting, vehicle ventilation systems, etc.). The system can also function to provide stand-alone purification capacity for indoor and/or enclosed spaces (e.g., as a free-standing air purifier for a domicile, a modular air purifier for a vehicle, etc.). The system 100 can also function to provide a high surface area photocatalytic surface (e.g., to increase pollutant reduction efficiency). The system 110 can also function to provide a photocatalytic surface that encourages increased localization time periods of pollutants proximal to the surface (e.g., enhances chemical affinity for VOCs and/or other pollutants). However, the system 110 can additionally or alternatively have any other suitable function.

The system 100 can receive power from an external source. In a first variation of the system, the system 100 can be connected to a source of electrical power (e.g., the power grid) by way of a direct electrical connection (e.g., a power cable). In a second variation of the system, the system 110 can convert input power into electrical power (e.g., from an air-driven generator in-line with an integrated ventilation system having a directed airflow), and/or can be connected to a source of electrical power (e.g., the power grid, building power, solar panels, a wind turbine, etc.) by way of a direct electrical connection. However, the system 100 can be otherwise suitably powered.

The system 100 can be operable between various operating modes, including an illuminated filtering mode, a dark filtering mode, a high flow rate mode, and a low flow rate mode. In the illuminated filtering mode, the system 100 includes a photon source 130 that is activated (e.g., emitting light) and the filter assembly is illuminated by the photon source 130 to induce photocatalytic electrochemical oxidation (PECO) of pollutants. In the dark filtering mode, air flow is drawn through system 100 (e.g., the prefilter, the unilluminated filter assembly, etc.) by the flow control mechanism 140 and visible light is prevented from escaping the system 100 (e.g., by turning off the photon source, by occluding the photon source 130 with a controllable baffle, by restricting the photon energies emitted by the photon source 130 to be outside the visible wavelength range, etc.). In the high flow rate mode, volumetric throughput of fluid flow through the system 100 is maximized (e.g., the flow control mechanism 140 is operated at maximum volumetric throughput, maximum power, etc.). In the low volume mode, volumetric throughput of fluid flow through the system 100 is reduced (e.g., below the maximum volumetric throughput, at the minimum volumetric throughput based on the flow control mechanism, reduced to zero by turning off the flow control mechanism, etc.). The system 100 is preferably operated between the aforementioned operating modes by the control subsystem 150 (e.g., as described in Section 3.5 below). However, the system 100 can additionally or alternatively be operated between any suitable operating modes in any suitable manner.

2. Benefits

Variants of the system can confer several benefits and/or advantages.

First, variants of the system can enable air disinfection and purification by destroying (e.g., chemically reacting with, oxidizing, eliminating, reducing the concentration of, etc.) pollutants (e.g., instead of trapping pollutants fully-constituted, retaining pollutants on a filter in chemically identical form).

Second, variants of the system can enable indoor air purification in a modular, movable form factor. Such variants enable the system to be employed in various indoor environments (e.g., a room in a residential building, a vehicle cabin, an airplane cabin, a hospital room, etc.).

Third, variants of the system can enable intuitive, instructive, and/or delightful interactions between the user and the system. For example, the system can include a user-interface 152 that includes a touch screen, wherein prompts, notifications, system information, and other data is rendered to the user and at which the user can provide inputs (e.g., via touch). The system can also be configured to be easily and/or intuitively disassembled (e.g., partially disassembled, fully disassembled, opened, etc.) by the user, so that disposable, maintainable, and/or replaceable components (e.g., filters) can be disposed of, replaced, or otherwise maintained. The system can also be configured to automatically orient the housing 110 appropriately during assembly (e.g., reassembly, partial reassembly, etc.) by the user, to facilitate proper closing of the housing 110 (e.g., the housing 110 can be self-aligning, a portion of the housing 110 such as a removable exterior panel 115 can be self-aligning, etc.). The system can also include a prefilter that is housed within a prefilter tray, wherein the prefilter tray can be configured to permit insertion into the housing 110 only when properly oriented (e.g., to guide the user in proper insertion). In variations, proper insertion of a component (e.g., a primary filter assembly, a prefilter tray of a prefilter assembly, etc.) can result in audible and/or haptic feedback (e.g., a snap noise, a click noise, an impulsive vibration, etc.). Variants of the system can also be configured to display instructions to the user that facilitate user interactions with the system (e.g., rendering text stating "press down" and subsequently rendering text stating "rotate counterclockwise" upon detection that the user has pressed down on the housing). Such instructions can be particularly beneficial in cases wherein a simplistic interaction may reduce system effectiveness (e.g., such as opening and/or closing operations that could reduce the effectiveness and efficiency of seals between the housing 110 and the external environment).

Fourth, variants of the system can enable and/or actively aid in troubleshooting of the system by the user. For example, such variants can automatically detect the presence or absence of a filter (e.g., a primary filter, a prefilter, etc.) and warn the user (e.g., via a displayed message, an auditory alert, etc.) that the filter is not present or incorrectly inserted. In another example, such variants can automatically determine and display filter health metrics (e.g., a filtration efficiency value) and/or data derived therefrom (e.g., a recommended filter replacement time) to the user based on collected performance data (e.g., pollutant concentrations in the outflow from the system, pressure drop values across filter elements, etc.).

Fifth, variants of the system can provide feedback (e.g., readily available feedback, obvious feedback, etc.) to the user to inform the user that the system is functioning properly (e.g., purifying the air). Such variants can reassure the user that may not otherwise be able to perceive the pollutant reduction efficacy of the system (e.g., because background pollutant concentrations may not be detectable by the user). For example, the system can display a colored light on an external surface that is green when the pollutant concentration in the exit stream of air flow (e.g., post-purification) is below a first threshold concentration, yellow when the pollutant concentration in the exit stream is below a second threshold concentration and above the first threshold concentration, and red when the pollutant concentration in the exit stream is above the second threshold concentration, thereby providing readily-noticeable and interpretable straightforward feedback to the user that the system is properly operating. However, such variants can additionally or alternatively provide feedback in any other suitable manner.

Sixth, variants of the system can actively and automatically adapt system operation to the local and present environment in which the system is operating, to enhance user comfort and/or happiness. For example, such variants can actively reduce a noise level emitted by the system (e.g., by reducing the power delivered to and/or rotation rate of an active flow control mechanism 140 such as a fan or impeller) based on the operating context of the system (e.g., based on detected ambient noise levels, based on whether users are detected proximal the system, etc.) and/or passively, irrespective of the particular context (e.g., by balancing fan blades to reduce contributions to undesirable audible harmonics, asymmetrically spacing fan blades, selecting RPM values associated with acoustic signatures having a low psychoacoustic penalty, etc.).

Seventh, variants of the system can enable single-pass air purification; for example, variants of the system and/or method can include destruction of pollutants above a threshold percentage reduction (e.g., 80%, 90%, 99.99%, etc.) after a single pass of air flow through the air purification system.

Eighth, variants of the system can enable pollutant reduction without using ionizing radiation (e.g., UV-C, hard-UV), instead using non-ionizing radiation (e.g., near-UV, UV A, UV B, visible radiation, etc.). The absence of ionizing radiation can, for example, prevent direct photoionization of compounds in the flow that can in turn form undesirable compounds (e.g., ozone) within the airflow.

However, variants of the systems and/or method can confer any other suitable benefits and/or advantages.

3.1 Housing

The system 100 includes a housing 110. The housing 110 functions to retain the components of the system. The housing 110 can also function to define air flow path(s) through the system 100 (e.g., between an inlets an outlets). The housing 110 preferably includes a pedestal 112 and an outer shell 114 configured to mate with the pedestal, wherein the outer shell 114 can be transitioned between an extended and compacted configuration with respect to the pedestal 112. The housing 110 can include a bias mechanism 113 (e.g., a coiled steel spring, a gas spring, etc.) that mechanically biases the outer shell 114 into the extended configuration, and a latch 116 that mechanically retains the outer shell 114 in the compacted configuration in opposition to the bias mechanism 113. The housing 110 also preferably defines a lumen, one or more inlets, and one or more outlets. However, the housing 110 can additionally or alternatively include or define any suitable components or features.

Figure 2A:
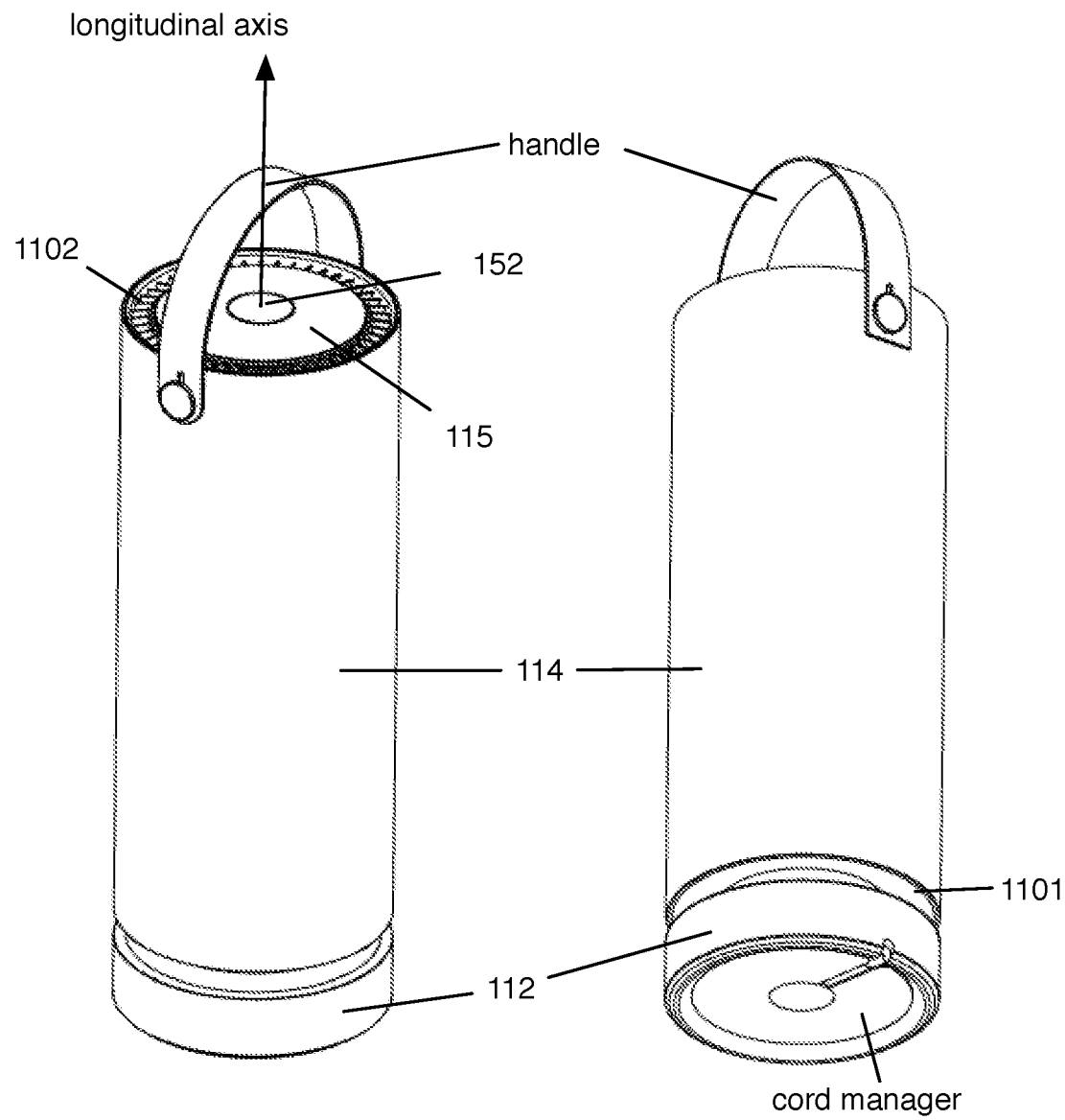
FIG. 2A depicts an illustration of a housing of an example embodiment of the air purification system from a first perspective.
Figure 3:
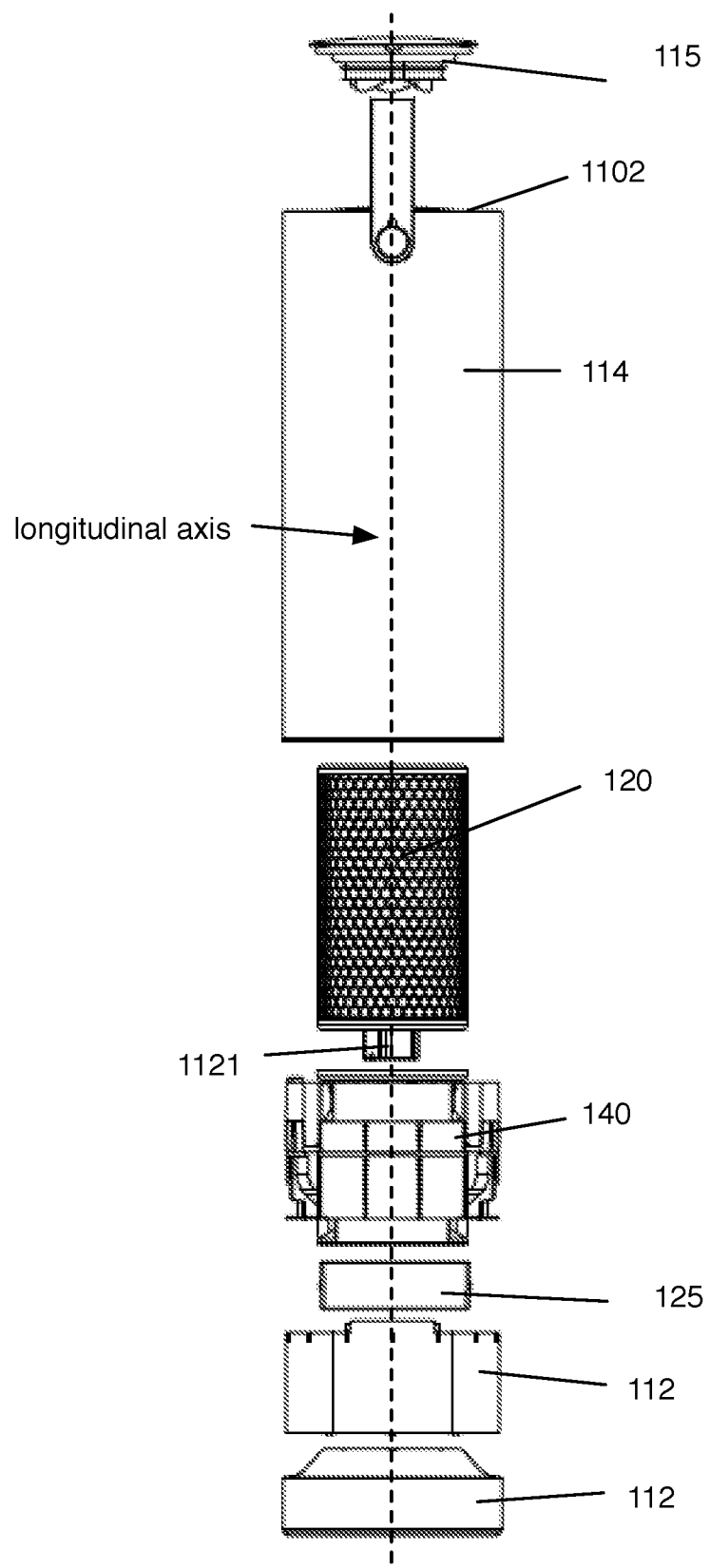
FIG. 3 depicts an exploded view of an example embodiment of the air purification system.

The housing 110 preferably defines a longitudinal axis, as shown in FIGS. 2A and 3. The longitudinal axis can define a translation direction of the outer shell 114 relative to the pedestal 112 (e.g., in transitioning between the extended configuration and the compacted configuration). The longitudinal axis can also define a reference geometry for other portions of the system 100 (e.g., an insertion axis of a prefilter tray, perpendicularly to the longitudinal axis). The housing 110 can additionally or alternatively define any other suitable geometric properties and/or features.

The housing 110 can be fabricated from one or more plastic materials (e.g., thermoplastic, polycarbonate, nylon, high- and/or low-density polyethylene, polystyrene, polyurethanes, polyvinyl chloride, acrylonitrile butadiene styrene, etc.) but can additionally or alternatively be made up of aluminum (e.g., brushed aluminum, anodized aluminum, etc.), other metallic and/or electrically- and/or thermally-insulating materials, and/or any other suitable material or combination thereof.

The housing 110 can also define a lumen 111 in fluid communication with the external environment (e.g., by way of an inlet 1101 and an outlet). The lumen 111 can be defined primarily by the outer shell 114 of the housing, primarily by the pedestal 112 of the housing, and/or by any other suitable combination of the pedestal, the outer shell, and any other suitable portion of the housing 110. The lumen 111 defined by the housing 110 functions to define a space within the housing 110 through which fluid (e.g., air) flows between an inlet 1101 and an outlet 1102. The lumen 111 can also function to define a void (e.g., a contiguous void, a plurality of discontinuous voids, etc.) in which system components (e.g., a flow control mechanism, a photon source, the filter assembly, etc.) are retained. The lumen 111 can also function to define one or more flow pathways between the inlet(s) and the outlet(s). The lumen 111 can also function to position the filter assembly within one or more flow pathways (e.g., such that air flow through the housing 110 passes air adjacent to the filter assembly for pollutant reduction). The lumen 111 can define any suitable retention points (e.g., posts, clips, brackets, etc.) at which system components (e.g., the filter assembly, the flow control mechanism) are retained.

However, the lumen 111 can be otherwise suitably defined by the housing 110.

Figure 2B:
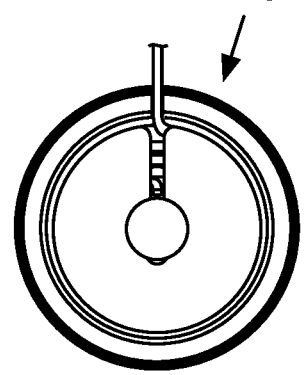
FIG. 2B depicts an illustration of the housing of the example embodiment of FIG. 2A from a second perspective.

In a specific example, as shown in FIGS. 2A-2B and 3, the lumen 111 is defined by a substantially cylindrical volume between an inlet, arranged at the base of the cylindrical volume proximal the pedestal 112 of the housing, and an outlet, arranged at the top of the cylindrical volume at an external surface of the outer shell 114 of the housing 110. In this specific example, the system 100 includes a primary filter assembly 120 and a photon source 130 that are arranged concentrically within the cylindrical volume, and oriented along the longitudinal centerline of the cylindrical volume. In this specific example, the flow control mechanism 140 is coupled to the pedestal 112 and arranged proximal the base of the cylindrical volume between the inlet 1101 and the filter assembly, and includes an impeller (e.g., impeller module) that spans the flow path between the inlet 1101 and the primary filter assembly 120. However, in additional and alternative examples, the lumen 111 can be otherwise suitably defined and be otherwise suitably arranged in relation to other components of the system.

The housing 110 can define an inlet 1101. The inlet 1101 of the housing 110 functions to provide an intake of air (e.g., pollutant-laden air) for provision to the lumen 111 (e.g., containing the filter assembly) for decontamination. In a first variation, the inlet 1101 is defined as an annular orifice between the pedestal 112 and the outer shell 114 through which air is drawn into the housing lumen 111. In this variation, the outer shell 114 is preferably sealed against the pedestal 112 in the compacted configuration of the housing, such that the inlet 1101 is the sole opening through which air can be drawn through the housing 110. The inlet 1101 can be fully open (e.g., without obstructions) but can additionally or alternatively include a screen, guide vanes, and/or any other suitable partial obstruction. However, the inlet 1101 can additionally or alternatively define any suitable shape, and/or can include a plurality of inlets distributed in any suitable manner.

The housing 110 can define an outlet 1102. The outlet 1102 of the housing 110 functions to output purified and/or disinfected air from the lumen 111 into the ambient environment (e.g., external environment) surrounding the system. The outlet 1102 can also function to direct fluid flow out of the system 100 into the environment in a controlled manner (e.g., to encourage mixing in an enclosed space, to enhance transport of purified air to predetermined or actively determined locations, etc.). In a first variation, the outlet 1102 is defined as an annular opening at the top surface of the outer shell, encircling the removable panel 115 of the outer shell 114 and a portion of a user-interface. In related variations, the outlet 1102 can define an opening of any suitable shape (e.g., a rectilinear shape, a non-rectilinear shape, a circle, an oval, etc.). The housing 110 preferably includes a single outlet but can additionally or alternatively include a plurality of outlets and/or define a plurality of orifices that make up the outlet 1102.

The housing 110 can include a pedestal 112. The pedestal 112 functions to provide a base for the system 100 to be placed in an environment in a freestanding manner. The pedestal 112 can also function to define mating surfaces and/or regions to receive corresponding regions of the outer shell 114 (e.g., in the compacted configuration of the housing). The pedestal 112 can also function to retain components of the system 100 (e.g., a flow control mechanism, a prefilter assembly, a power cord, power supply module, etc.). The pedestal 112 can also function to mechanically guide the outer shell 114 into specified orientations (e.g., azimuthal positions relative to the pedestal) during transitioning of the outer shell 114 between the extended and compacted configurations. The pedestal 112 can include a tray reception orifice, a member 1122 that extends along the longitudinal axis, and any other suitable components. In variations, the pedestal 112 and/or portions thereof can define a portion of the latch 116 that retains the housing 110 in the compacted configuration.

Figure 6:
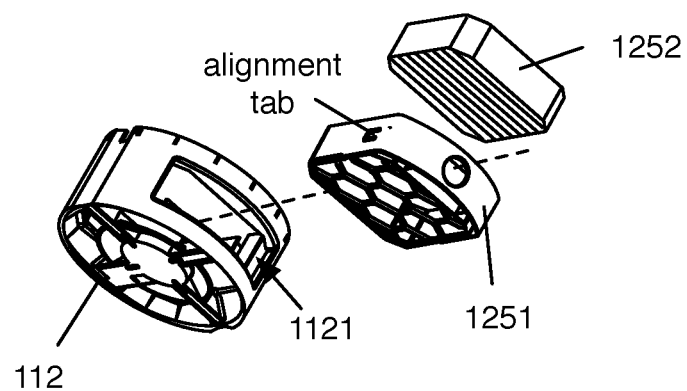
FIG. 6 depicts an illustration of an example embodiment of a portion of the air purification system.

In variations, the pedestal 112 can define a tray reception orifice 1121. The tray reception orifice 1121 functions to receive a prefilter assembly 125 that includes a prefilter tray 1251. The tray reception orifice 1121 can define an insertion axis, along with the prefilter tray is inserted into the tray reception orifice 1121 to secure the prefilter tray within the pedestal 112. The tray reception orifice 1121 can define a projected area normal to the insertion axis (e.g., the shape of the orifice) that is shaped to provide a single possible orientation for insertion of the prefilter tray 1251. Accordingly, the projected area is preferably asymmetric about at least one axis perpendicular to the insertion axis, and in variations can be asymmetric about two axes (e.g., mutually perpendicular axes, distinct axes, etc.) that are perpendicular to the insertion axis, to provide a matching receptacle for a projected area of the prefilter tray (e.g., asymmetric about the same at least one axis). The tray reception orifice 1121 preferably extends through the pedestal 112 in a direction transverse to the longitudinal axis (e.g., as shown in FIG. 6), across the flow pathway between the inlet 1101 and the outlet 1102.

The housing 110 can include a latch, and the pedestal 112 can define at least a portion of the latch 116. The latch 116 can include one or more male portions and one or more female portions, and the pedestal 112 can define a male portion and/or a female portion of the latch 116. The portion of the latch 116 defined by the pedestal 112 can be arranged at any suitable location on the pedestal; for example, the pedestal 112 can define a female portion of the latch 116 about an outer diameter of the pedestal 112 (e.g., a female threaded portion that mates to a male thread defined by the outer shell). In another example, the pedestal 112 can include a member 1122 that extends upwards along the longitudinal axis away from the base of the pedestal, and the member 1122 can define a male portion of the latch 116 (e.g., one or more protrusions of a bayonet latch 116 that mate to one or more grooves defined by the outer shell 114 and/or a top panel 115 thereof).

The pedestal 112 can include a member 1122 that extends into the lumen 111 of the housing 110 from the pedestal 112. The member 1122 can extend along the longitudinal axis (e.g., centrally) into the lumen 111 but can additionally or alternatively extend into the lumen 111 from any suitable off-center portion of the pedestal 112. The member 1122 can function to retain and/or support components of the system 100 that are arranged in the lumen 111 (e.g., the primary filter assembly, photon source, etc.) or proximal a top region of the lumen 111 (e.g., a user-interface 152 that is exposed at the external face of the outer shell 114 and attached to the central member). The member 1122 can also function as a conduit for power provision from a power supply in the pedestal 112 base to components arranged upon the member 1122 (e.g., light emitters of the photon source, a display of the user interface, etc.). The member 1122 can also define a portion of the latch 116 to mate with a corresponding portion of the latch 116 defined by the outer shell; for example, the latch 116 can be a bayonet latch, wherein the outer shell 114 defines a set of grooves that receive and lock upon a set of protrusions defined by the member 1122 of the pedestal 112.

As shown in FIG. 2B, the pedestal 112 can include a cord manager. The cord manager functions to house a power cord connected to the system 100 and provide a retention mechanism to avoid excess cord length between the location of the system 100 and a power socket. In a specific example, the cord manager can define a planar disc offset from a recess within the pedestal, wherein the void between the planar disc and the recess functions to house a coiled cord (e.g., coiled about a central member 1122 that attaches the planar disc to the remainder of the pedestal). However, the cord manager can be otherwise suitably configured (e.g., as a spring-loaded retractable cord) or omitted.

The housing 110 can include an outer shell 114. The outer shell 114 functions to contain other components of the system 100 and provide a barrier between the lumen 111 of the housing 110 and the external environment. The outer shell 114 can also function to provide an aesthetically pleasing outer surface of the system. In variations, the outer shell 114 can also function to provide a mounting surface for externally-facing components of the system 100 (e.g., the user interface, a handle, light emitters for signaling, etc.). The outer shell 114 can include a removable panel, and can define at least a portion of the latch, at least a portion of an inlet 1101 or an outlet, and any other suitable features or components.

The outer shell 114 can move between various arrangements corresponding to the extended and compacted configurations of the housing 110. In the extended configuration of the housing, the outer shell 114 is preferably displaced upward relative to the pedestal 112 to expose a portion of the pedestal 112 to the external environment (e.g., a portion that exposes the tray reception orifice). In the compacted configuration of the housing, the outer shell 114 is preferably locked to the pedestal 112 (e.g., via the latch), sealed against the pedestal 112 (e.g., wherein the inlet 1101 and outlet 1102 provide the sole gateways for fluid flow through the housing 110 lumen), and disposed downward towards the pedestal 112 relative to the position of the outer shell 114 in the extended configuration. However, the outer shell 114 can be otherwise suitably operable between any other suitable configurations, positions, and/or arrangements in conjunction with operation of the housing 110 between the extended and compacted configurations.

In a specific example, the outer shell 114 is operable between an extended configuration and a compacted configuration. In the extended configuration in this example, the outer shell 114 is arranged distal the pedestal 112 along the longitudinal axis (e.g., pushed by a force supplied by the bias mechanism) and a female portion of the latch, defined by the outer shell, is disengaged from a male portion of the latch 116 defined by the pedestal 112. In the compacted configuration in this example, the outer shell 114 is constrained proximal the pedestal 112 along the longitudinal axis by the latch 116 (e.g., opposing the force of the bias mechanism), and the male portion of the latch 116 is engaged with the female portion of the latch 116. In a related example, in the extended configuration, the tray reception orifice 1121 is unobstructed by the outer shell 114 along the insertion axis (e.g., as shown in FIG. 8B), and in the compacted configuration, the tray reception orifice 1121 is obstructed by the outer shell 114 along the insertion axis (e.g., as shown in FIG. 8A).

In a first variation, as shown in FIGS. 5A-F and 7, the outer shell 114 is movably coupled to the pedestal 112 by a captive roller bearing (e.g., a tracked roller, a linear bearing, etc.), and translates along the captive roller bearing as the housing 110 transitions between the compacted and extended configurations. The roller bearing is preferably rigidly fixed to an internal support structure 126 of the housing 110 and captive in a channel defined by the outer shell, but in alternative variations the roller bearing can be rigidly fixed to the outer shell 114 and the channel can be defined by the internal support structure 126 of the housing 110.

In variations wherein the housing 110 includes a latch, the outer shell 114 can define a portion of the latch 116 (e.g., a female portion, a male portion, a combination of male and female portions, etc.). In an example, the latch 116 is a bayonet latch, and the outer shell 114 defines a set of recessed grooves (e.g., a female portion of the bayonet latch) that mate with a set of protrusions (e.g., defined by the pedestal, a member 1122 of the pedestal, etc.) and can act to securely retain the outer shell 114 against the pedestal 112 or allow the outer shell 114 to translate vertically relative to the pedestal 112 (e.g., in the compacted or extended configuration of the housing, respectively).

The housing 110 can include a bias mechanism 113 that functions to apply a force to the outer shell 114 such that, in the absence of an opposing force of sufficient magnitude (e.g., supplied by a latch, gravity, etc.), the outer shell 114 is translated away from the pedestal 112 (e.g., into the extended configuration of the housing).

The bias mechanism 113 can include one or more springs (e.g., gas springs), coupled between housing 110 elements (e.g., the outer shell 114 and the pedestal, the outer shell 114 and the flow control mechanism, the removable panel 115 and the remainder of the outer shell, etc.), to provide an assisting force in decoupling housing 110 elements and/or transitioning the housing 110 between the extended and compacted configurations. For example, the system 100 can include a gas spring between the pedestal 112 and the outer shell 114 that applies a force such that when a set of tabs defined by the outer shell 114 are released from a set of detents in helical grooves defined by the pedestal 112 (e.g., via pushing downwards on the outer shell 114 to free the tabs from the detents, pulling upwards on the outer shell 114 to free the tabs from the detents, etc.), the gas spring provides an upward force that moves the tabs along the helical grooves until they can freely translate upward to place the outer shell 114 distal the pedestal 112 and the housing 110 into the extended configuration. However, the housing 110 can include any number of any other suitable force generation mechanisms (e.g., biasing the housing 110 elements apart and/or together) in any other suitable configuration.

In variations, the gas springs can define a rebound speed of the outer shell 114 away from the pedestal 112 (e.g., under the force applied by the gas springs working against the weight of the outer shell 114 and friction between the outer shell 114 and components of the housing 110 against which it is translating). In some variations, the rebound speed can be adjustable (e.g., user adjustable, automatically adjustable by the control subsystem, manually adjustable, etc.). In some variations, the rebound speed can be fixed and predetermined (e.g., based on user preferences, with any other suitable basis, etc.).

In a specific example, the bias mechanism 113 includes a gas spring that biases the outer shell 114 toward the extended configuration (e.g., supply a force to translate the outer shell) and are restrained and/or opposed in the compacted configuration by one or more mechanical retention elements (e.g., tabs, latches, bayonet couplers, etc.) arranged to prevent translation of the outer shell 114 (e.g., by at least partially obstructing the linear path of the roller bearing, by resisting the force supplied by the bias mechanism, etc.). In the extended configuration, the mechanical retention elements are removed from the linear path of the roller bearing (e.g., by rotating the outer shell, by depressing the outer shell 114 and allowing a spring loaded element to actively displace the mechanical retention element, etc.) and the outer shell 114 is biased distal the base region of the system 100 (e.g., the pedestal, the flow control mechanism, etc.) by the gas springs as shown in FIGS. 5C-D.

The bias mechanism 113 can additionally or alternatively include various devices to apply a biasing force. For example, the bias mechanism 113 can include a counterweight mechanism that applies a gravitational force acting on the counterweight to a tension-bearing member 1122 (e.g., a cable, a cord, etc.) that, in turn, applies the biasing force to the outer shell 114. In another example, the bias mechanism 113 can include a steel coil spring that operates in an analogous manner to the gas spring and can define a different force profile and/or translation speed. However, the bias mechanism 113 can additionally or alternatively include any suitable mechanism for applying a bias force to the outer shell 114.

The outer shell 114 can include a removable panel 115. The removable panel 115 functions to provide access to the lumen 111 of the housing 110 when the panel 115 is removed from the outer shell 114. The removable panel 115 can also function to couple to the primary filter assembly 120 and enable removal and/or replacement of the primary filter assembly 120 by removing the removable panel, and to retain the primary filter assembly 120 at the desired position within the lumen 111 when the removable panel 115 is fixed to the outer shell 114. In variations, the removable panel 115 can define a portion of the latch 116 that couples the outer shell 114 to the pedestal 112 (e.g., to retain the outer shell 114 in the compacted configuration of the housing). In variations, the removable panel 115 can also define an orifice through which a portion of the user-interface 152 (e.g., a display of the user interface 152 mounted to the member 1122 of the pedestal) extends, such that the portion is accessible from outside the outer shell 114 (e.g., as shown in FIGS. 9A-9B).

Figure 7:
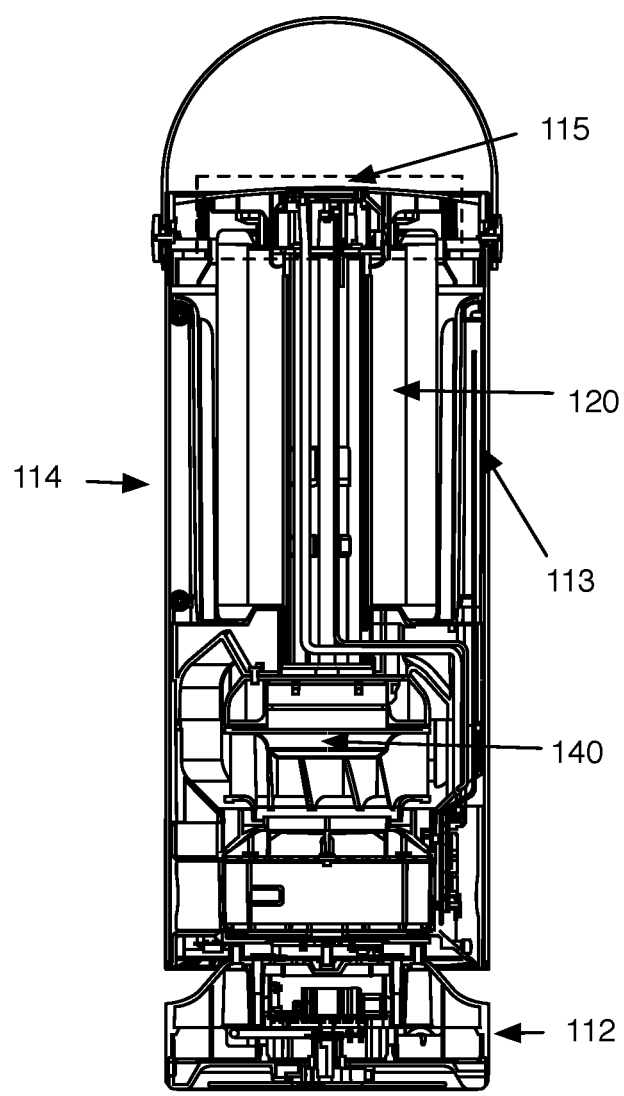
FIG. 7 depicts a cross sectional view of an example embodiment of the air purification system.
Figures 10A, 10B:
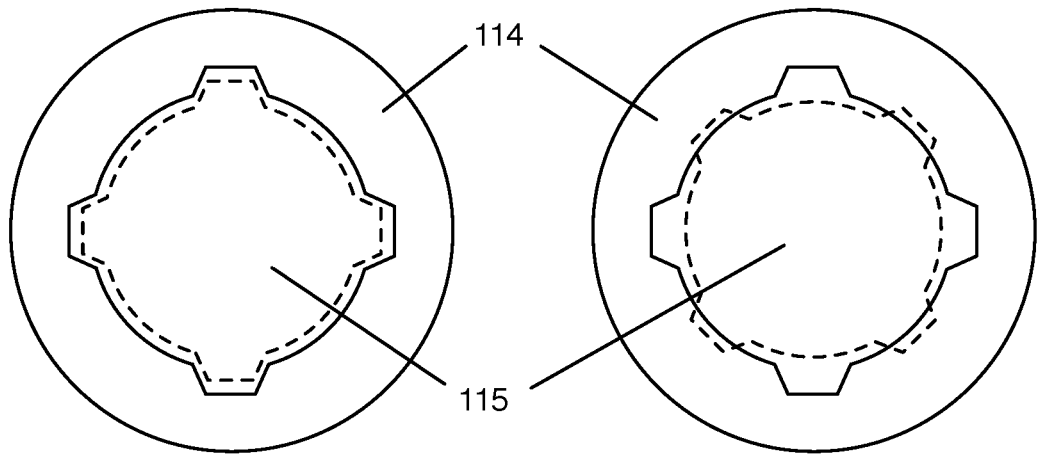
FIGS. 10A-10B depict top down views of an uncoupled and coupled configuration, respectively, of a removable panel of a portion of an embodiment of the air purification system.

In a first variation, as shown in FIGS. 7 and 10A-10B, the removable panel 115 is coupled to the remainder of the outer shell 114 by an alignment mechanism that includes a set of tabs defined by the panel 115 (e.g., arranged about the rim of the panel) and a corresponding set of recesses (e.g., arranged about an interior rim of the top of the outer shell), and alignment of the tabs and recesses allows the removable panel 115 to mount flush with the top of the outer shell 114 and rotated into a locked position (e.g., by rotating the tabs through a groove defined interior to the rim of the top of the outer shell). In a related variation, the tabs can be defined by the outer shell 114 and the recesses can be defined by the removable panel and can be similarly mated. However, the removable panel 115 can be otherwise suitably coupleable to the remainder of the outer shell 114.

The panel 115 is preferably arranged at the top of the outer shell 114 but can additionally or alternatively be located at any suitable location of the outer shell 114. The panel 115 is preferably completely removable from the outer shell 114 but can additionally or alternatively be partially removable (e.g., such that it remains partially attached to the outer shell 114 but can be dislodged from its position to provide access to the lumen). The panel 115 can, in variations, be coupled to the outer shell 114 by a set of tabs that allow the panel 115 to be removed when the set of tabs are aligned with a corresponding set of recesses of the outer shell and retain the panel 115 when the set of tabs are rotated away from the set of recesses (e.g., as shown in FIGS. 10A-10B).

Figures 11A, 11B:
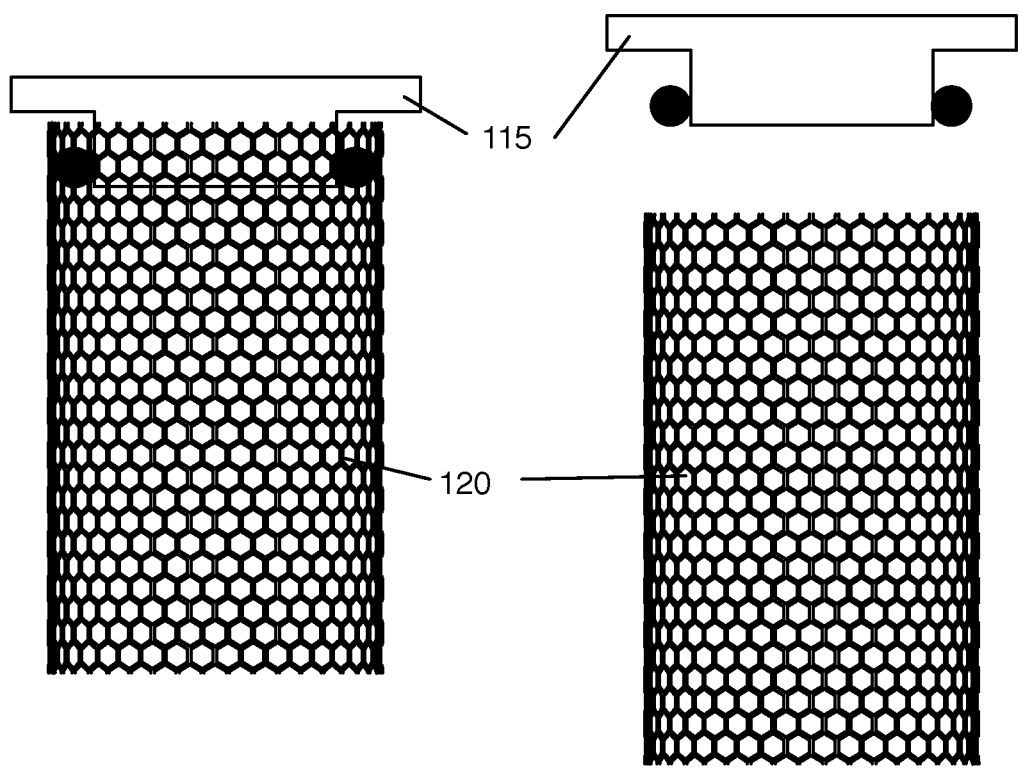
FIGS. 11A-11B depict side views of a coupled and uncoupled configuration, respectively, of a primary filter assembly and removable panel of a portion of an embodiment of the air purification system.

The panel 115 can define a filter attachment region that couples to the primary filter assembly 120 (e.g., such that the removable panel 115 and the primary filter assembly 120 are mechanically contiguous when the system is assembled). The filter attachment region is preferably a flexible, annular, three-dimensional gasket that couples to the primary filter assembly 120 via a friction fit (e.g., as shown in FIGS. 11A-11B). However, the filter attachment region can otherwise suitably attach to the primary filter assembly 120 (e.g., via a clip, latch, adhesive, hook and loop fastener, threads, etc.).

In variations wherein the housing 110 includes a latch, and wherein the outer shell 114 defines a portion of the latch, the removable panel 115 can define the portion of the latch 116 (e.g., a female portion, a male portion, both female and male portions, etc.). For example, the pedestal 112 can include a member 1122 that extends vertically along the longitudinal axis towards the top of the outer shell 114 where the outer shell 114 includes the removable panel, and the member 1122 can define a male portion of a bayonet latch, and the removable panel 115 defines a female portion of a bayonet latch 116. In this example, the housing 110 is operable in the compacted configuration when the removable panel 115 is secured to the outer shell 114 (e.g., by way of a set of tabs and corresponding recesses and grooves as described above) and the male and female portions of the bayonet latch 116 are securely coupled (e.g., in opposition to the bias force supplied by the bias mechanism). In this example, the primary filter assembly 120 (e.g., a tubular primary filter assembly) can be coupled to a filter attachment region (e.g., a flexible friction-fit annular gasket attached to the removable panel) and retained within the lumen 111 of the housing 110 and encircle the member 1122 of the pedestal 112 when the housing 110 is configured in the compacted configuration. However, in additional or alternative examples, the removable panel 115 of the housing 110 can be otherwise suitably configured or arranged, and/or omitted.

3.2 Primary Filter Assembly

The system 100 can include a primary filter assembly 120. The primary filter assembly 120 functions to filter air that passes through the lumen 111 of the housing 110 between the inlet 1101 and the outlet 1102 (e.g., urged by a flow control mechanism). In variations, the primary filter assembly 120 can also function to destroy pollutants (e.g., in variations wherein the primary filter assembly 120 includes a photocatalyst). The primary filter assembly 120 can include a substrate 122 and, in variations, a photocatalytic material 124 disposed on the substrate 122. The primary filter assembly 120 can optionally include a support structure 126.

The primary filter assembly 120 is preferably removable (e.g., by the user) from the lumen 111 of the housing 110 (e.g., for replacement, maintenance, insertion, removal, etc.). For example, the primary filter assembly 120 can be coupled to the filter attachment region of a removable panel 115 of the outer shell, such that the removable panel 115 and primary filter assembly 120 can be removed (e.g., when the housing 110 is in the extended configuration and the set of tabs of the removable panel 115 are disengaged from the outer shell). However, in additional or alternative variations, the primary filter assembly 120 can be permanently integrated with the housing 110 (e.g., non-removable).

In variations, the filter assembly can function to provide a photocatalytic surface that, when illuminated by a photon source, destroys (e.g., oxidizes, directly reacts with, etc.) pollutants in a fluid stream in contact therewith and/or proximal thereto. The filter assembly also functions to retain the photocatalytic elements of the system 100 in one or more flow paths of fluid through the housing 110. The filter assembly also functions to retain the photocatalytic elements of the system 100 relative to the photon source(s) at an appropriate position for illumination of the photocatalytic material 124 by the photon source(s). The filter assembly includes a substrate 122 and can include a photocatalytic material 124 disposed on the substrate 122. The filter assembly can also include a support structure 126 that mechanically supports the coupled substrate 122 and defines the shape of the primary filter assembly 120.

The filter assembly is preferably retained within the lumen 111 of the housing 110 by the removable panel 115 of the outer shell 114. In a first variation, the filter assembly is attached to the removable panel 115 at a concentric attachment point (e.g., arranged at the bottom of the removable panel) such that the filter assembly is positioned concentrically within the lumen 111 (e.g., a cylindrical housing 110 lumen) by the removable panel, upon coupling of the removable panel 115 to the outer shell 114. The filter assembly is preferably in fluid communication with the ambient environment, by way of the inlet 1101 and outlet 1102 defined by the housing 110. However, the filter assembly can be otherwise suitably fluidly connected. In variations of the system 100 including a photon source, the filter assembly is can be arranged proximal the photon source, such that the photon source 130 can illuminate the surface area (e.g., the entire surface area, a maximized portion of the surface area, another suitable portion of the surface area, etc.) of the filter assembly. However, the filter assembly can be otherwise suitably arranged within the housing 110 and relative to any other suitable system components.

In a specific example, as shown in FIG. 3, the filter assembly is shaped as a cylindrical tube (e.g., by a metallic mesh support structure) and is retained concentrically within the lumen 111 by an attachment point at the removable panel 115.

In another specific example, the primary filter assembly 120 includes a substrate 122 and a plurality of photocatalytic particles disposed on the substrate, and the system 100 includes a photon source 130 disposed on the pedestal 112 (e.g., a member 1122 of the pedestal). In this example, the photon source 130 is arranged on the member 1122 that is arranged concentrically within an interior surface of the primary filter assembly 120 to illuminate the interior surface; however, in further examples, the primary filter assembly 120 and photon source 130 can be otherwise suitably relatively arranged.

Figures 5A, 5B:
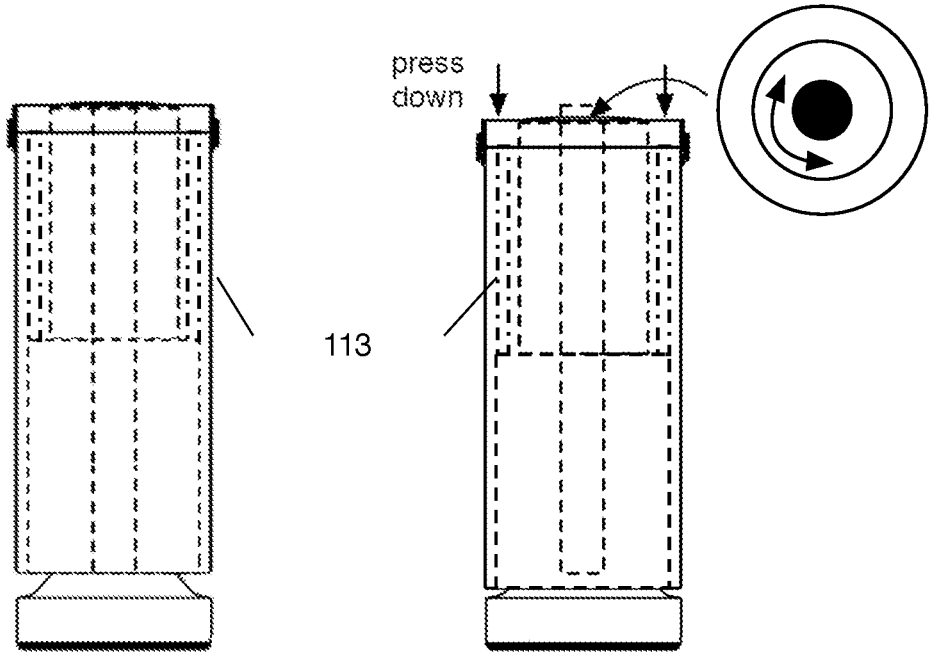
FIG. 5A depicts a cross-sectional view of an example system configuration prior to filter replacement.
FIG. 5B depicts a cross-sectional view of the example system configuration of FIG. 5A during a first portion of filter replacement.

The system 100 is preferably configured to facilitate intuitive and straightforward insertion and/or replacement of the primary filter assembly 120. In a first specific example, filter replacement is facilitated by the system 100 as follows: as shown in FIG. 5A, the outer shell 114 of the housing 110 is depressed toward the pedestal, against the upward force of one or more gas springs configured to bias the outer shell 114 distal the pedestal 112. As shown in FIG. 5B, the removable panel 115 is rotated relative to the fixed reference frame of the outer shell 114 (e.g., clockwise, counterclockwise) while the system 100 is in the compacted configuration, which disposes the mechanical retention elements out of the linear path that the outer shell 114 travels as it transitions between the compacted and extended configurations. As shown in FIG. 5C, the filter assembly (coupled to the removable panel) can be removed vertically from the top surface of the outer shell. The filter assembly can be decoupled from the removable panel, as shown in FIG. 5D, and optionally replaced. The filter assembly (e.g., a new filter assembly, a cleaned filter assembly, etc.) can then be recoupled to the removable panel, and vertically inserted into the upper surface of the outer shell 114. As shown in FIG. 5E, the outer shell 114 can be pressed downward into the compacted configuration, and the removable panel 115 (coupled to the filter assembly) rotated (e.g., in the opposite direction as during filter removal) to dispose the mechanical retention elements into the linear path of travel of the outer shell 114. Upon release, the gas spring(s) bias the outer shell 114 out of the compacted configuration into a configuration between the compacted and extended configuration (e.g., the default position along the linear travel between the compacted and extended configuration) as shown in FIG. 5F. However, the system 100 can be otherwise suitably configured to facilitate filter removal and reinsertion, and the filter assembly can be otherwise suitably replaced.

In examples, the primary filter assembly 120 can be configured to generate an audible mechanically-generated noise (e.g., a snap, a click, etc.) upon coupling to the removable panel 115 and/or the outer shell 114 (e.g., by way of the removable panel) to inform the user that the primary filter assembly 120 is properly attached.

In some variations, the substrate 122 of the filter assembly functions to provide a material to which photocatalytic material 124 can be attached, and with which fluid can be brought into contact for purification. The substrate 122 is preferably directly connected and permanently attached to the filter assembly but can additionally or alternatively be removably coupled to the filter assembly. In an alternative variation, the substrate 122 can be a fibrous substrate 122 that functions as a trapping filter (e.g., a HEPA standard filter) and can omit photocatalytic material 124. However, the substrate 122 can be otherwise suitably configured.

In a first specific example, the substrate 122 is formed in a substantially cylindrical shape having a corrugated outer surface, wherein the corrugation is along an azimuthal axis of the cylinder (e.g., undulating in the azimuthal direction). In related examples, the broad surface undulates in 2 dimensions (e.g., exhibits a knurling pattern), has a honeycomb surface arrangement (e.g., a closely packed pattern of hexagonal three-dimensional cavities), and can be fashioned into any suitable geometry (e.g., a cylinder, a cube, a sinuous layered stack, etc.). In a related specific example, the substrate 122 is pleated and maintained in a cylindrical configuration (e.g., pleated about an azimuthal direction) by a support structure 126 as described below.

In variations, the substrate 122 includes a textile material (e.g., felt, wool-fiber-based, synthetic-fiber-based, blended natural and synthetic fibers, etc.). However, the substrate 122 can additionally or alternatively include any other suitable fibrous material. The fibrous material of the substrate 122 is preferably made up of substantially opaque fibers (e.g., opaque to visible and near-visible light frequencies) but can additionally or alternatively be made up of non-opaque fibers (e.g., transparent, translucent, etc.). In further alternatives, the fibrous material can include optical fibers configured to transport photons along the longitudinal axes of the fibers (e.g., via total internal reflection). In yet further alternatives, the fibrous material can include optical fibers that have incompletely-matched cladding, partial cladding, or are otherwise "leaky" to permit a fraction of the transported light from exiting the fiber and illuminating one or more photocatalytic particles (e.g., disposed on the leaky fiber). In another variation, the substrate 122 includes a metallic surface on which nanostructures can be directly grown (e.g., via chemical vapor deposition, electro-deposition, etc.). However, the substrate 122 can additionally or alternatively include any other suitable material that can act as a medium upon which the photocatalytic material 124 can be disposed.

The filter assembly preferably includes a support structure 126 (e.g., wire mesh) that functions to mechanically support the substrate 122 and can also function to give the substrate 122 a defined shape. In variations wherein the substrate 122 is made of a textile material that is substantially flexible, the support structure 126 can provide rigidity thereto. The shape of the support structure 126 preferably defines the shape of the substrate 122 as discussed above; however, the support structure 126 can additionally or alternatively have any suitable shape (e.g., in cases wherein the textile material can permanently or semi-permanently define a rigid or semi-rigid shape without requiring an additional rigid support structure).

In variations of the system 100 including a photon source, the support structure 126 can be arranged at the side of the substrate 122 opposing the side proximal the photon source 130 (e.g., to minimize occlusion of the substrate 122 from the photon source 130 by the support structure). However, the support structure 126 can additionally or alternatively be otherwise suitably arranged relative to the photon source 130.

The support structure 126 is preferably made up of a low-outgassing material. The low-outgassing material can include, in variations, a heat treated (e.g., baked, fired, etc.) aluminum alloy, a polymer or other suitable material having a low vapor pressure (e.g., less than 1 atm, 0.1 atm, 0.00001 atm, etc.), a metallic or non-metallic material free of solvents or chemicals that may appreciably outgas, and any other suitable material. However, the support structure 126 can additionally or alternatively be made of any other suitable material.

In variations of the system 100 including a photocatalytic material, the photocatalytic material 124 functions to provide a catalytic site for reduction of pollutants at the surface of the filter assembly. The photocatalytic material 124 can also function to generate an electron-hole pair upon illumination by a photon, which preferably generates a hydroxyl radical upon interacting with water vapor contained in the surrounding air. The hydroxyl radical thus generated preferably contributes to chemical reduction of pollutants. However, the pollutants can be otherwise suitably reduced and/or destroyed (e.g., via direct photoionization, secondary photoionization, direct reaction with a free electron and/or hole, etc.).

The photocatalytic material 124 is preferably formed at least partially from nanostructures, and the nanostructures are preferably formed at least partially from one or more photocatalysts (e.g., titanium dioxide in anatase, rutile, and/or any other suitable phase; sodium tantalite; doped titanium dioxide; etc.), but can additionally or alternatively be formed from any other suitable material (e.g., carbon, carbon-containing compounds, rare earth metals, precious metals, any metallic element or compound, etc.). The nanostructures can include nanobeads, nanospheres, nanotubes, hollow nanotubes, a homogenous or heterogeneous material made up of any of the aforementioned nanostructures and/or any other suitable nanostructures or combinations thereof.

The photocatalytic material 124 is coupled to the substrate 122. In a first variation, the photocatalytic material 124 is secured to the fibers of a fibrous substrate 122 (e.g., by way of an adhesive, electrostatic attachment, covalent linking, ionic bonding, etc.). In a second variation, the photocatalytic material 124 is deposited directly onto the surface of the substrate 122 (e.g., grown on the substrate 122 directly through chemical vapor deposition, ion deposition, etc.). The photocatalytic material 124 can be secured to a layer of the substrate 122 (e.g., a surface layer), multiple layers of the substrate 122 (e.g., a top and bottom layer), bodily attached to the substrate 122 (e.g., substantially homogenously through the volume of the substrate), or otherwise suitably secured. Additionally or alternatively, the photocatalytic material 124 can be otherwise suitably attached to the substrate 122 in any suitable manner.

3.2.1 Prefilter Assembly

The system 100 can include a prefilter assembly 125. The prefilter assembly 125 functions to remove macroscopic contaminants from the airflow prior to interaction of the airflow with the primary filter assembly 120 (e.g., and PECO elimination of pollutants, contaminants, etc.; further filtration by a non-photocatalytic filter; etc.). The prefilter is preferably arranged between the inlet 1101 and the filter assembly within the housing 110 lumen, and more preferably arranged between the inlet 1101 and the flow control mechanism but can be otherwise suitably arranged at any other suitable location within the system. The prefilter assembly 125 can include a prefilter 1252 and a prefilter tray 1251. The prefilter is preferably retained by the prefilter tray, which can be inserted and/or removed from the housing 110 (e.g., with respect to a corresponding orifice of the pedestal 112 of the housing, as shown in FIGS. 5C and 5D), but can be otherwise suitably retained.

The prefilter tray 1251 is preferably insertable into or removable from the tray reception orifice 1121 defined by the pedestal 112 in the extended configuration of the housing, which preferably exposes the tray reception orifice 1121 to the external environment. In the compacted configuration, the outer shell 114 preferably covers the tray reception orifice 1121 and prevents exterior access to the prefilter assembly 125. However, the prefilter tray can additionally or alternatively be coupled to the housing 110 in any other suitable manner (e.g., permanently integrated into the housing, attached to the primary filter assembly 120 as a layer thereof or otherwise positioned upstream of the substrate, etc.).

The prefilter tray can be shaped to prevent insertion in all but the preferred orientation. For example, the tray reception orifice 1121 can define an insertion axis perpendicular to the longitudinal axis of the housing 110 and a first projected area normal to the insertion axis, and the prefilter tray can define a second projected area, and the prefilter tray can be insertable into or removable from the tray reception orifice 1121 along the insertion axis upon alignment between the first projected area and the second projected area (e.g., once the housing 110 is in the extended configuration that exposes the tray reception orifice). In another example, the first and second projected areas are asymmetric about a first axis perpendicular to the insertion axis and a second axis perpendicular to the first axis and the insertion axis (e.g., the projected area is asymmetric about two axes). In further examples, the prefilter tray and the tray reception orifice 1121 can have any suitable asymmetries about any suitable number of axes to allow insertion in the preferred orientation. The asymmetric feature(s) can, in some variations, be defined as the shape of the tray; in additional or alternative variations, the asymmetric features can be protrusions, tabs, recesses, and any other suitable morphological features of the tray that define an asymmetric projected and/or cross-sectional area that limits the number of suitable insertion orientations of the prefilter tray 1251.

In a specific example, as shown in FIG. 6, the prefilter tray includes a tab configured to permit insertion of the prefilter tray into the corresponding orifice solely in the desired orientation. The corresponding orifice preferably includes a receiving surface that is configured to receive the tab solely in the desired orientation; in the absence of the correct mating orientation between the prefilter tray and the corresponding orifice, the prefilter tray is preferably not insertable into the corresponding orifice. In a related example, the prefilter tray can have a projected area in the direction of insertion that defines a specified shape, wherein the corresponding orifice defines a void having the specified shape such that insertion of the prefilter tray into the corresponding orifice is possible solely when the prefilter tray is properly aligned. However, the prefilter tray can be otherwise suitably insertable into the housing 110.

However, the system 100 can additionally or alternatively include a prefilter assembly 125 in any other suitable configuration, and/or omit a prefilter assembly 125.

3.3 Photon Source

The system 100 can optionally include a photon source 130. The photon source 130 is preferably included in variations of the system 100 that include a photocatalytic material 124 integrated with the primary filter assembly, and in such cases functions to illuminate the photocatalytic material, and thereby generate electron-hole pairs (e.g., that can subsequently react with water vapor to form hydroxyl radicals for oxidation of pollutants). The photon source 130 also functions to generate photons at a specified photon energy or range of photon energies. Preferably, the photon energies correspond to portions of the electromagnetic spectrum having a longer wavelength (i.e., lower energy) than UV-B or UV-C to avoid direct photoionization of airborne compounds; alternatively, the photon energies can alternatively correspond to portions of the electromagnetic spectrum having shorter wavelengths (e.g., corresponding to UV-B or UV-C wavelength ranges). However, the photons generated by the photon source 130 can additionally or alternatively have any suitable energy and/or range of energies. The photon source 130 preferably includes a plurality of light emitters (e.g., light emitting diodes, fluorescent tubes, incandescent emitters, multiplexed optical fibers, etc.) arranged in an emitter array, but can additionally or alternatively include any suitable number of light emitters (e.g., a single LED, a single UVA compact fluorescent bulb, etc.) arranged in any other suitable manner. In a further variation, the system 100 does not include an integrated photon source 130 and is illuminated by an external source (e.g., sunlight) directed (e.g., via reflectors, optical fibers, etc.) to illuminate the filter assembly.

The photon source 130 is preferably arranged within the housing 110 such that the photons emitted therefrom illuminate the photocatalytic material 124 of the filter assembly. In a first variation, the photon source 130 is arranged within a void defined by the filter assembly (e.g., inserted within the filter assembly) and is thus circumscribed by the filter assembly. However, the photon source 130 can be otherwise suitably arranged. The photon source 130 is preferably coupled to the pedestal 112 and extends upward from the flow control mechanism 140 within the housing 110 lumen; however, the photon source 130 can alternatively be coupled to the removable panel 115 (e.g., be removed upon removal of the removable panel 115 along with the filter assembly coupled thereto), and additionally or alternatively otherwise suitably coupled. The photon source 130 is preferably operable between an on state and an off state, wherein in the on state the photon source 130 is powered and emitting photons, and wherein in the off state the photon source 130 is unpowered and not emitting photons. The photon source 130 can be operable at any state between the on state and the off state, wherein any number of photons between zero photons and the maximum number of photons are emitted. The photon source 130 is preferably operated between the on state and the off state by the control subsystem 150 (e.g., in response to instructions generated by the control subsystem 150 and/or received from the user at a user interface 152 of the control subsystem), but can be otherwise suitable operated (e.g., via plugging in and/or unplugging the system from grid power).

The radiant intensity of the light output by the photon source 130 can have any suitable intensity (e.g., at least 1 watt per square meter, 25 W/m$^2$, 50 W/m$^2$, etc.) at the majority of the illuminated surface of the filter assembly (e.g., 100% of the surface, 90% of the surface, 50.1% of the surface, etc.). However, the photon source 130 can otherwise generate any suitable radiant intensity at the illuminated surface of the filter assembly.

The photon source 130 preferably includes a plurality of light emitting diodes (LEDs) configured in a three-dimensional array. The array of LEDs is arranged within the system 100 surrounded by the filter assembly and illuminates the internal surface of the substrate 122 of the filter assembly (and the photocatalytic material 124 disposed thereon). In a specific example of this variation, the photon source 130 includes an array of 25 LEDs, including 5 vertical rows that include 5 LEDs in each row, equally spaced azimuthally within each row and equally spaced vertically between each row. However, the photon source 130 can additionally or alternatively include a plurality of LEDs arranged in array of any suitable shape (e.g., right rectangular prismatic, tapered rectangular prismatic, right hexagonal prismatic, tapered hexagonal prismatic, right pentagonal prismatic, tapered pentagonal prismatic, conical, etc.).

The photon source 130 can be operable between various modes including a dark mode. The dark mode can function to limit the amount of visible light emitted by the system 100 (e.g., escaping from outlets of the system). In some variations, the dark mode includes turning the photon source 130 off (e.g., operating the photon source 130 in an off state). In some variations, the dark mode includes modulating the emitted wavelength distribution such that light emitted by the photon source 130 or re-emitted by illuminated portions of the system 100 (e.g., the photocatalytic material) is not in the visible range. In further variations, the dark mode can include physically occluding the light emitted by the photon source 130 to prevent it from exiting the lumen 111 (e.g., via a baffle). Operation of the photon source 130 in the dark mode can be performed by the control subsystem 150 (e.g., automatically) and/or by any other suitable component or entity (e.g., manually by the user, wherein the user manually adjusts a cover that blocks light from being emitted from the housing) with any suitable basis (e.g., based on a time of day, detected ambient light levels, a recurring or ad hoc schedule, etc.).

3.4 Flow Control Mechanism

The system 100 preferably includes a flow control mechanism 140. The flow control mechanism 140 functions to urge fluid flow through the device (e.g., within the lumen between the inlet and the outlet). The flow control mechanism 140 can also function to modulate flow variables of the fluid flowing through the device (e.g., temperature, humidity, density, pressure, energy, etc.). The flow control mechanism 140 is preferably directly coupled to the pedestal 112 and vertically arranged atop the pedestal 112 (e.g., abutting the pedestal, offset from the pedestal, etc.), but can be otherwise suitable arranged and/or coupled. The flow control mechanism 140 is preferably arranged proximal to at least one of the inlet 1101 and the outlet 1102 of the housing 110. The flow control mechanism 140 can include one or more passive flow guides and/or an arrangement of features configured to direct airflow out of the flow control mechanism 140. The passive flow guides can function to direct airflow within the housing 110 lumen, proximal the filter assembly. However, the flow control mechanism 140 can additionally or alternatively include any suitable active or passive flow control surfaces.

In one variation, the flow control mechanism 140 includes an impeller arranged within the housing, downstream of the inlet 1101 and upstream of the filter assembly. However, the impeller can be otherwise suitably arranged. In related variations, the flow control mechanism 140 can include any other suitable active flow promoter, such as a jet, a propeller, a fan, a rotor, a thermal pump, a reciprocating pump, or any other suitable mechanism for urging flow between the inlet 1101 and the outlet 1102.

In a specific example, the system 100 includes a flow control mechanism 140 that includes an impeller module arranged within the pedestal, wherein the impeller module is operable to urge air flow along a flow path defined between an inlet 1101 and an outlet 1102 of the housing 110. However, the system 100 can additionally or alternatively include a flow control mechanism 140 of any suitable type arranged in any suitable manner with respect to a flow path through the system.

The flow control mechanism 140 can be operable between various modes including a quiet mode. The quiet mode can function to limit the amount of audible noise emitted by the system 100 (e.g., escaping from outlets of the system). In some variations, the quiet mode includes turning the flow control mechanism 140 off (e.g., ceasing active operation of the flow control mechanism, operating the flow control mechanism 140 in an off state, etc.). In some variations, the quiet mode includes modulating the emitted acoustic signature (e.g., the frequency distribution of emitted noise) such that the emitted noise is not audible (e.g., by adjusting the rotation frequency of a spinning element of the flow control mechanism). Operation of the flow control mechanism 140 in the quiet mode can be performed by the control subsystem 150 (e.g., automatically) and/or by any other suitable component or entity (e.g., manually by the user, wherein the user manually adjusts the flow rate, fan speed, or similar parameter) with any suitable basis (e.g., based on a time of day, detected ambient noise levels, a recurring or ad hoc schedule, etc.).

3.5 Control Subsystem

The system 100 can include a control subsystem 150. The control subsystem 150 functions to control the operation of the air purification system 100 between operating modes.

The control subsystem 150 can also function to operate the photon source 130 between operating modes (e.g., an on mode, an off mode, a high-power mode, a low power mode, a dark mode, etc.) in variations of the system 100 including a photon source 130. The control subsystem 150 can also function to control the operation of the flow control mechanism 140 between operating modes (e.g., an on mode, an off mode, a high-speed mode, a low-speed mode, a quiet mode, etc.) in variations of the system 100 including a flow control mechanism 140. The control subsystem 150 can also function to receive instructions from and provide messages to a user.

Operation of the system 100 can be based on user instructions (e.g., ad hoc instructions received via the user interface, scheduled instructions previously received via the user interface 152 or other means, etc.), detected sensor 151 outputs, or have any other suitable basis.

The control subsystem 150 preferably includes a controller, one or more sensors communicatively coupled to the controller, and a user-interface 152 coupled to an external surface of the housing 110 and communicatively coupled to the controller.

In variations, the control subsystem 150 can be communicatively coupled to the flow control mechanism; likewise, in variations including a photon source, the control subsystem 150 can be communicatively coupled thereto (e.g., via direct electrical connection, wireless data connection, a combination of data and power connections, etc.). However, the control subsystem 150 and/or portions thereof can additionally or alternatively be otherwise suitably coupled to any other system components.

The control subsystem 150 can implement active control of portions of the system 100 (e.g., based on the configuration of the housing 110 between the extended and the compacted configurations). For example, the control subsystem 150 can include a displacement sensor 151 that detects the displacement of the outer shell 114 relative to the pedestal, and the control subsystem 150 can automatically operate the photon source 130 between an on state and an off state based on an output of the displacement sensor 151 indicative of a displacement between the pedestal 112 and the outer shell 114 exceeding a threshold displacement. In a related example, the control subsystem 150 can automatically operate the impeller module between an on state and an off state based on an output of the displacement sensor 151 indicative of a displacement between the pedestal 112 and the outer shell 114 exceeding a threshold displacement. The displacement sensor(s) in the above examples can be binary relative to the threshold (e.g., wherein the displacement sensor 151 includes an electrical contact arranged on the pedestal 112 and an electrical contact arranged on the outer shell 114 that come into electrical contact at the threshold displacement and output a positive signal, and a zero signal or dispositive signal in all other conditions) or proportional to the displacement (e.g., a voltage signal output that is linearly proportional to the relative displacement) to determine the displacement relative to the threshold. In another example, the prefilter tray can include an orientation sensor, and the control subsystem 150 can detect the orientation that the prefilter tray is inserted into the tray reception orifice, and control components based on the orientation (e.g., automatically turning off the flow control mechanism 140 or preventing activation of the flow control mechanism 140 based on detecting an upside-down or otherwise improper insertion of the prefilter assembly). However, the control subsystem 150 can additionally or alternatively implement active control in any other suitable manner.

The control subsystem 150 can implement passive control of portions of the system 100 (e.g., based on the configuration of the housing 110 between the extended and the compacted configurations). For example, the control subsystem 150 can include a switch operable between a closed state, wherein the outer shell 114 is in the compacted configuration, and an open state, wherein the outer shell 114 is in the extended configuration, and the control subsystem 150 can automatically operate the photon source 130 between an on state corresponding to the closed state of the switch and an off state corresponding to the open state of the switch (e.g., wherein the switch allows electrical power to flow to the photon source, and thus the photon source 130 cannot operate when the housing 110 is in the extended configuration in this example). In a related example, the control subsystem 150 the impeller module is operable between an on state corresponding to the closed state of the switch and an off state corresponding to the open state of the switch. In another example, insertion of the prefilter assembly 125 into the tray reception orifice 1121 closes a switch that allows electrical power to flow to flow control mechanism 140 and/or photon source 130. However, the control subsystem 150 can additionally or alternatively implement passive control in any other suitable manner.

In the active control and passive control implementations, the control of the flow control mechanism 140 and/or photon source 130 functions to automatically cease operation of one or both components when the housing 110 is open (e.g., in the extended configuration) and/or when the system is improperly assembled (e.g., the primary filter assembly 120 is improperly inserted, the prefilter assembly 125 is improperly inserted, etc.).

The control subsystem 150 can include a user-interface 152 that functions to enable a user to interact with the system, and for the user to provide user inputs to the control subsystem 150 (e.g., for the generation of control inputs to various system components). The user-interface 152 can also function to provide (e.g., render, display, emit, etc.) messages (e.g., instructions, notifications, etc.) to the user (e.g., to facilitate user interactions with the system, to provide the user with information regarding system performance, etc.).

The user interface 152 can generate and provide general messages to a user to report aspects of system operation. Such messages can be in the form of visual indicators, audible indicators (e.g., beeps, chimes, etc.), text rendered at a screen of the user interface, and any other suitable format. The messages can function to provide output to ensure that a user knows that the system 100 is functioning (e.g., an audible tone upon system 100 activation) and/or how well it is functioning (e.g., outputting a performance metric rendered as a colored light that maps to the performance metric value, such as green for high performance, yellow for average performance, and red for poor performance; outputting light at a light emitter that emits one of a set of hues, wherein each hue of the set of hues corresponds to a performance metric value within a corresponding range; etc.). The messages can also function to guide the user in system use and/or troubleshooting. For example, if the housing 110 is in the extended configuration, the user interface 152 can display a message that informs the user that the housing 110 must be in the compacted configuration for the flow control mechanism 140 and/or photon source 130 to be activated, and a graphical animation illustrating the steps for the user to take to transition the housing 110 into the compacted configuration. However, the messages can communicate any suitable information about system operation to the user.

Figure 4:
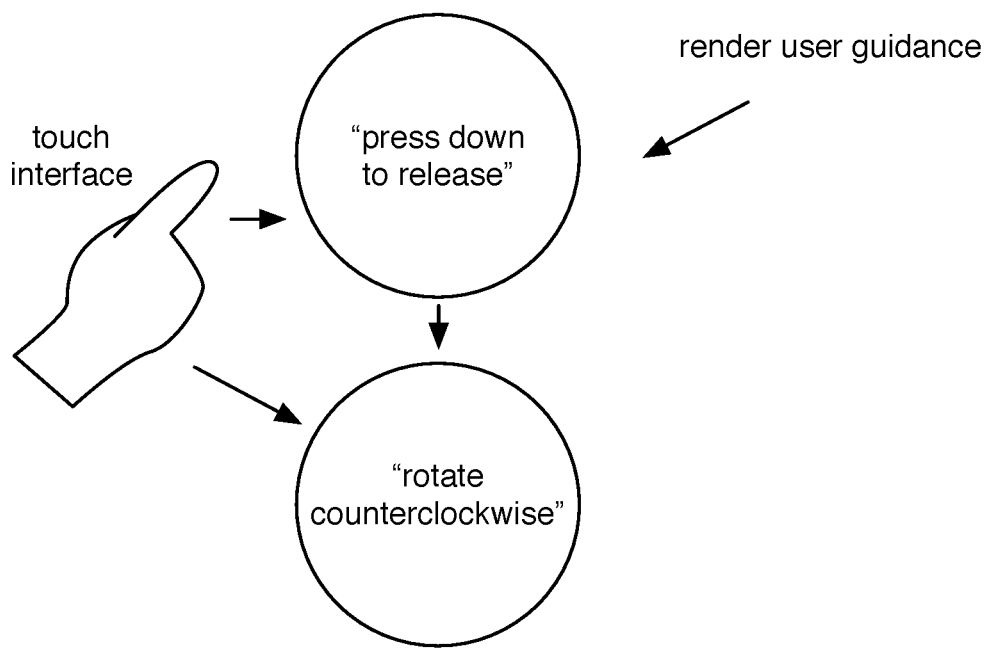
FIG. 4 depicts an illustration of example renderings at a user-interface of an example embodiment of the air purification system.

In a specific example, the user-interface 152 includes a touch screen (e.g., a capacitive touch screen) arranged at a top portion of the external surface of the housing, as shown by example in FIGS. 2A and 4. However, the user-interface 152 can include any other suitable interface inputs (e.g., buttons, switches, latches, keypads, microphones, wireless radios, etc.) and/or outputs (e.g., lights, speakers, wireless radios, screens, etc.).

The control subsystem 150 preferably includes one or more sensors communicatively coupled to the controller. The sensors function to detect parameters of system operation and provide signal outputs based on the detected parameters. The system 100 can include one or more fluid pressure sensors, contact pressure sensors particulate sensors, pollutant (e.g., chemical) sensors, temperature sensors, humidity sensors, VOC sensors, dust sensors, optical sensors, illumination-level sensors, mechanical sensors (e.g., contact switches, pressure switches, etc.), and any other suitable type of sensors. In variations, the control subsystem 150 can include a networked connected processing unit and related hardware, which can enable the system 100 to receive device-applicable data from external sensors or systems, allowing the unit to understand environmental conditions and drive improved performance. The control subsystem 150 can, in variations, operate components between operating modes based on the sensor 151 outputs (e.g., received by the control subsystem 150 via communicative coupling such as a direct data connection, analog signal, digital signal, wireless signal, wired signal, etc.).

The control subsystem 150 can determine a performance metric value (e.g., based on a sensor 151 output) and provide an indicator (e.g., message) to a user based on the performance metric value. Performance metric values can include flow rates, pollutant concentrations (e.g., absolute concentrations, relative concentrations between the inlet 1101 and the outlet, etc.), pollutant types (e.g., which pollutants are present in the air stream among a set of known and/or detectable pollutants or pollutant categories), auditory signatures, vibrations, and any other suitable metrics of system performance.

For example, in response to the differential pressure drop measured by a sensor 151 exceeding a threshold pressure drop, the control subsystem 150 can generate an alert (e.g., a notification that the prefilter should be replaced due to excessive pressure drop).

In another example, the control subsystem 150 can provide a replacement notification to a user (e.g., at a user interface 152 displayed on the housing, at a client application executing on a mobile device associated with the user, etc.) based on the pollutant concentration in the exiting airflow exceeding a threshold value.

In a specific example, the system 100 can include a pollutant sensor 151 proximal the outlet 1102 of the housing 110 (e.g., a diode laser gas sensor, a particulate sensor, etc.), and the control subsystem 150 can operate the photon source 130 according to the output of the pollutant sensor 151 (e.g., turning the photon source 130 into an on state based on detected pollutants of a given type, exceeding a threshold concentration, etc.).

In another example, the system 100 can include one or more pairs of pressure sensors across one or more elements disposed within the flow path (e.g., the filter assembly, the flow control mechanism, the prefilter, etc.) to measure the differential pressure drop across such elements; in response to the differential pressure drop exceeding a threshold pressure drop, the control subsystem 150 can generate an alert (e.g., a notification that the prefilter should be replaced due to excessive pressure drop).

In yet another example, the control subsystem 150 can receive localized (e.g., geotagged) environmental data from external sources (e.g., reported data on current particulate concentration in the area proximal the device), and in response the controller can alter system parameters and/or settings (e.g., flow rate, illumination intensity, etc.) based on the environmental data (e.g., based on an increased environmental particulate load) and operate the system 100 according to the altered parameters and/or settings.

In variations, the sensors can be user-installable and/or distinct (e.g., not integrated) from the system. For example, the system 100 can include a sensor 151 (e.g., a VOC sensor, a particulate sensor, a diode laser gas sensor, etc.) that can be affixed to an outlet 1102 of the system 100 (e.g., securely coupled to a guide vane or other surface of the outlet) and communicatively coupled to the controller of the control subsystem 150 (e.g., via a wireless communication methodology such as Bluetooth, WiFi, BLE, Zigbee, radio, etc.).

The control subsystem 150 can additionally or alternatively operate the system 100 between various operating modes, including a continuous mode, a closed loop mode, and a user-controlled mode. In the continuous operating mode, the system 100 is operating continuously to process and purify air. In the closed loop operating mode, the control subsystem 150 operates the system 100 between an on state and an off state, wherein in the on state the system 100 is actively purifying air and promoting air flow through the device and in the off state the system 100 is dormant, based on sensor 151 inputs. In the user-controlled operating mode, the system 100 is operated according to user instructions received by the control subsystem 150. User instructions can include an operation schedule (e.g., a range of times during which the system is to be operated in the on or off states), an operation condition (e.g., a pollutant level and/or air quality metric threshold at which the system is to be activated and operated in the on state), and/or any other suitable user instructions.

3.6 Additional System Examples

In a first specific example, the air purification system 100 includes a housing 110 defining a longitudinal axis and a lumen 111 in fluid communication with an external environment. The housing 110 includes a pedestal 112 defining a tray reception orifice, and an outer shell 114 coupled to the pedestal 112 by a latch 116 and a bias mechanism 113. In this example, the tray reception orifice 1121 defines an insertion axis perpendicular to the longitudinal axis, and a first projected area normal to the insertion axis. In this example, the outer shell 114 is operable between an extended configuration and a compacted configuration. In the extended configuration in this example, the outer shell 114 is arranged distal the pedestal 112 along the longitudinal axis by the bias mechanism 113 and unrestricted by the latch 116 and the tray reception orifice 1121 is unobstructed by the outer shell 114 along the insertion axis. In the compacted configuration in this example, the outer shell 114 is constrained proximal the pedestal 112 along the longitudinal axis by the latch 116 in opposition to the bias mechanism 113 and the tray reception orifice 1121 is obstructed by the outer shell 114 along the insertion axis. In this example, the system 100 includes a prefilter assembly 125 that includes a prefilter tray and a prefilter retained by the prefilter tray 1251. In this example, the prefilter tray defines a second projected area, and the prefilter tray is insertable into the tray reception orifice 1121 along the insertion axis upon alignment between the first projected area and the second projected area when the housing 110 is in the extended configuration.

In another specific example, the air purification system 100 includes a housing 110 defining a longitudinal axis and a lumen 111 in fluid communication with an external environment. In this example, the housing 110 includes a pedestal 112 defining a male portion of a latch, and an outer shell 114 coupled to the pedestal 112 by the latch 116 and a bias mechanism 113. In this example, the outer shell 114 includes a panel 115 that defines a filter attachment region and a female portion of the latch 116. In this example, the housing 110 is operable between an extended configuration and a compacted configuration. In the extended configuration in this example, the outer shell 114 is arranged distal the pedestal 112 along the longitudinal axis by the bias mechanism 113 and the male portion of the latch 116 is disengaged from the female portion of the latch 116. In the compacted configuration in this example, the outer shell 114 is constrained proximal the pedestal 112 along the longitudinal axis by the latch, and the male portion of the latch 116 is engaged with the female portion of the latch 116. This example also includes a primary filter assembly 120 coupled to the filter attachment region, wherein the primary filter assembly 120 can be fixed within the lumen 111 by the panel 115 (e.g., in the compacted configuration of the housing), and removable from the lumen 111 along with the panel 115 (e.g., in the extended configuration).

It should be noted that where coordinate systems and terminology related to relative orientation(s) are used herein, such terminology shall not be construed as referenced to global coordinates and/or orientations except where appropriate and/or explicit. For example, a system 100 component having a "top" and/or "bottom" shall not be construed as having a particular orientation in relation to a gravity vector except as appropriate and/or explicit. Similarly, "vertical" and/or "horizontal" directions in relation to system 100 components shall not be construed as having a particular orientation in relation to a gravity vector except as appropriate and/or explicit.

Embodiments of the system 100 and/or variations thereof can be embodied and/or implemented at least in part by a machine configured to receive a computer-readable medium storing computer-readable instructions. The instructions are preferably executed by computer-executable components preferably integrated with the system 100 and one or more portions of the processor and/or the control subsystem 150. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. An air purification system comprising:
a housing defining a longitudinal axis and a lumen in fluid communication with an external environment, and comprising:
a pedestal defining a tray reception orifice, wherein the tray reception orifice defines: an insertion axis perpendicular to the longitudinal axis, and a first projected area normal to the insertion axis, wherein the pedestal further defines a first portion of a latch;
an outer shell coupled to the pedestal by the latch and a spring, wherein the outer shell comprises a panel defining a second portion of the latch, complimentary to the first portion of the latch, wherein the outer shell is operable between:
an extended configuration, wherein the outer shell is arranged distal the pedestal along the longitudinal axis by the spring and unrestricted by the latch, wherein the tray reception orifice is unobstructed by the outer shell along the insertion axis, and
a compacted configuration, wherein the outer shell is constrained proximal the pedestal along the longitudinal axis by the latch in opposition to the spring, wherein the tray reception orifice is obstructed by the outer shell along the insertion axis; and
a prefilter assembly comprising a prefilter tray and a prefilter retained by the prefilter tray, wherein the prefilter tray defines a second projected area, wherein the prefilter tray is insertable into the tray reception orifice along the insertion axis upon alignment between the first projected area and the second projected area.

2. The system of claim 1, wherein the first and second projected areas are asymmetric about a first axis perpendicular to the insertion axis.

3. The system of claim 2, wherein the first and second projected areas are asymmetric about a second axis perpendicular to the insertion axis and the first axis.

4. The system of claim 1, further comprising an impeller module arranged within the pedestal, wherein the impeller module is operable to urge air flow along a flow path defined between an inlet and an outlet of the housing, wherein the flow path intersects the prefilter.

5. The system of claim 4, further comprising a switch operable between a closed state, wherein the outer shell is in the compacted configuration, and an open state, wherein the outer shell is in the extended configuration, and wherein the impeller module is operable between an on state corresponding to the closed state of the switch and an off state corresponding to the open state of the switch.

6. The system of claim 1, wherein the second portion of the latch comprises a female portion of the latch, wherein the pedestal comprises a member that extends along the longitudinal axis to the panel and defines a male portion of the latch, and wherein the latch comprises a bayonet latch.

7. The system of claim 6, wherein the panel defines a filter attachment region, and further comprising a primary filter assembly coupled to the filter attachment region, wherein the primary filter assembly is retained within the lumen and encircles the member in the compacted configuration of the outer shell.

8. The system of claim 7, wherein the primary filter assembly comprises a substrate and a plurality of photocatalytic particles disposed on the substrate, and further comprising a photon source coupled to the member.

9. An air purification system comprising:
a housing defining a longitudinal axis and a lumen in fluid communication with an external environment, and comprising:
a pedestal defining a first portion of a latch;
an outer shell coupled to the pedestal by the latch and a spring, wherein the outer shell comprises a panel that defines a filter attachment region and a second portion of the latch, wherein the panel is arranged distal the pedestal, and wherein the outer shell is operable between:
an extended configuration, wherein the outer shell is arranged distal the pedestal along the longitudinal axis by the spring and the first portion of the latch is disengaged from the second portion of the latch, and
a compacted configuration, wherein the outer shell is constrained proximal the pedestal along the longitudinal axis by the latch, wherein the first portion of the latch is engaged with the second portion of the latch; and
a primary filter assembly coupled to the filter attachment region, wherein the filter attachment region comprises an annular gasket, wherein the primary filter assembly is fixed within the lumen by the panel in the compacted configuration, wherein the primary filter assembly is removable from the lumen and the panel is removable from the outer shell in the extended configuration.

10. The system of claim 9, wherein the annular gasket couples an inner surface of the primary filter assembly to the panel using a friction fit.

11. The system of claim 9, wherein the first portion of the latch comprises a male portion of the latch, wherein the second portion of the latch comprises a female portion of the latch, wherein the pedestal comprises a member that extends along the longitudinal axis within the lumen, and wherein the member defines the male portion of the latch.

12. The system of claim 11, wherein the latch comprises a bayonet latch, wherein the male portion of the latch comprises a set of protrusions, and wherein the female portion of the latch comprises a set of recessed grooves that correspond to the set of protrusions.

13. The system of claim 11, wherein the primary filter assembly comprises a substrate and a plurality of photocatalytic nanoparticles disposed on the substrate, and further comprising a photon source arranged on the member, wherein the member is arranged concentrically within an interior surface of the primary filter assembly in the compacted configuration.

14. The system of claim 13, further comprising a displacement sensor and a control subsystem automatically operates the photon source between an on state and an off state based on an output of the displacement sensor indicative of a displacement between the pedestal and the outer shell exceeding a threshold displacement.

15. The system of claim 9, further comprising an impeller module arranged within the pedestal, wherein the impeller module is operable to urge air flow along a flow path defined between an inlet and an outlet of the housing.

16. The system of claim 15, further comprising a displacement sensor and a control subsystem that automatically operates the impeller module between an on state and an off state based on an output of the displacement sensor indicative of a displacement between the pedestal and the outer shell exceeding a threshold displacement.

17. The system of claim 15, wherein the pedestal defines a tray reception orifice that extends through the pedestal and intersects the flow path downstream of the impeller module, and wherein the outer shell seals against the pedestal upstream of the tray reception orifice and downstream of the inlet in the compacted configuration.

18. The system of claim 17, further comprising a prefilter assembly comprising a prefilter tray and a prefilter retained by the prefilter tray, wherein the prefilter tray is insertable into the tray reception orifice in the extended configuration of the outer shell.

19. The system of claim 18, wherein the tray reception orifice defines an insertion axis perpendicular to the longitudinal axis and a first projected area normal to the insertion axis, wherein the prefilter tray defines a second projected area, and wherein the prefilter tray is insertable into the tray reception orifice along the insertion axis upon alignment between the first projected area and the second projected area in the extended configuration.

20. The system of claim 19, wherein the first projected area and the second projected area are asymmetric about a first axis perpendicular to the insertion axis and a second axis perpendicular to the first axis and the insertion axis.

* * * * *